(12) United States Patent
Ambartsoumian et al.

(10) Patent No.: US 12,555,498 B2
(45) Date of Patent: Feb. 17, 2026

(54) LABEL SYSTEM AND METHOD FOR LABELLING PRE-IDENTIFIED MICROSCOPE SLIDES

(71) Applicant: 13652611 CANADA INC., Laval (CA)

(72) Inventors: Gourgen Ambartsoumian, Laval (CA); John Wagner, Laval (CA); Timothy Ostiguy, Laval (CA)

(73) Assignee: 13652611 CANADA INC., Laval (CA)

( * ) Notice: Subject to any disclaimer, the term of this patent is extended or adjusted under 35 U.S.C. 154(b) by 128 days.

(21) Appl. No.: 18/517,257

(22) Filed: Nov. 22, 2023

(65) Prior Publication Data

US 2024/0331579 A1    Oct. 3, 2024

Related U.S. Application Data

(60) Provisional application No. 63/499,593, filed on May 2, 2023, provisional application No. 63/492,616, filed on Mar. 28, 2023.

(51) Int. Cl.
*G09F 3/02* (2006.01)
*B32B 7/06* (2019.01)
(Continued)

(52) U.S. Cl.
CPC .............. *G09F 3/0288* (2013.01); *B32B 7/06* (2013.01); *B32B 7/12* (2013.01); *B32B 15/08* (2013.01); *B32B 15/12* (2013.01); *B65C 1/02* (2013.01); *C09J 5/00* (2013.01); *C09J 7/29* (2018.01); *G09F 3/0297* (2013.01); *G09F 3/10* (2013.01); *B32B 2307/4023* (2013.01);
(Continued)

(58) Field of Classification Search
CPC . B32B 15/08; B32B 15/12; B32B 2307/4023; B32B 2307/412; B32B 2307/414; B32B 2405/00; B32B 2519/00; B32B 7/06; B32B 7/12; B65C 1/02; G02B 21/34; G09F 2003/0202; G09F 2003/0229; G09F 2003/023; G09F 2003/0257; G09F 3/0288; G09F 3/0297; G09F 3/10; C09J 2203/334; C09J 2301/16; C09J 2301/302; C09J 2400/163; C09J 5/00; C09J 7/20; C09J 7/203; C09J 7/29
See application file for complete search history.

(56) References Cited

U.S. PATENT DOCUMENTS 6,187,128 B1 *   2/2001   Oosterlinck .......... B65C 9/1869
                                                       156/382
9,611,062 B2 *   4/2017   Palmisano .............. B65C 9/02
(Continued)

OTHER PUBLICATIONS

Translation of WO 2013180617, 2013.*
Translation of WO 2021226717, 2021.*

*Primary Examiner* — Sonya M Sengupta
(74) *Attorney, Agent, or Firm* — NORTON ROSE FULBRIGHT CANADA LLP

(57) ABSTRACT

A label for matrix tube may have a facestock configured to have data on a first surface thereof. An adhesive layer may be on a second surface of the facestock. The facestock may define an cover label portion, a main label portion and a neck portion between the cover label portion and the main label portion, the neck portion being narrower than the cover label portion and the main label portion. A method for applying a label onto a matrix tube may also be provided.

12 Claims, 12 Drawing Sheets

(51) Int. Cl.
*B32B 7/12* (2006.01)
*B32B 15/08* (2006.01)
*B32B 15/12* (2006.01)
*B65C 1/02* (2006.01)
*C09J 5/00* (2006.01)
*C09J 7/29* (2018.01)
*G09F 3/00* (2006.01)
*G09F 3/10* (2006.01)

(52) U.S. Cl.
CPC ... *B32B 2307/412* (2013.01); *B32B 2307/414* (2013.01); *B32B 2405/00* (2013.01); *B32B 2519/00* (2013.01); *C09J 2203/334* (2013.01); *C09J 2301/16* (2020.08); *G09F 2003/0202* (2013.01); *G09F 2003/0229* (2013.01); *G09F 2003/023* (2013.01); *G09F 2003/0257* (2013.01)

(56) References Cited

U.S. PATENT DOCUMENTS

| | | | | |
|---|---|---|---|---|
| 2013/0201553 A1* | 8/2013 | James | ................ | G02B 21/34 |
| | | | | 359/398 |
| 2015/0107751 A1* | 4/2015 | Palmisano | .......... | B65C 11/0289 |
| | | | | 156/64 |
| 2022/0058984 A1* | 2/2022 | Ambartsoumian | ... | B65C 9/0006 |
| 2024/0331579 A1* | 10/2024 | Ambartsoumian | ... | G09F 3/0288 |
| 2025/0196146 A1* | 6/2025 | Anandakathir | .......... | B41J 2/442 |

* cited by examiner

FIG. 2A¹

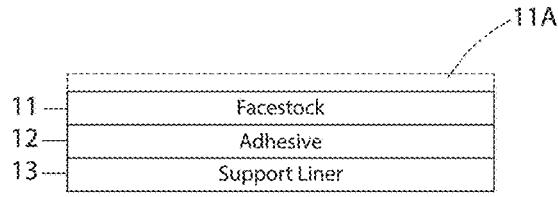
FIG. 3A
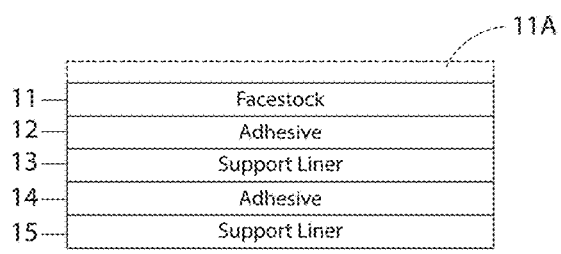
FIG. 3B
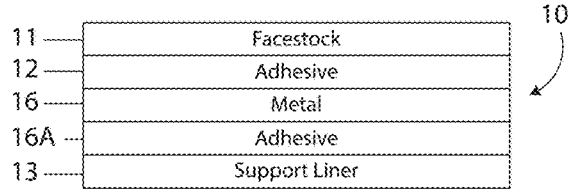
FIG. 3C
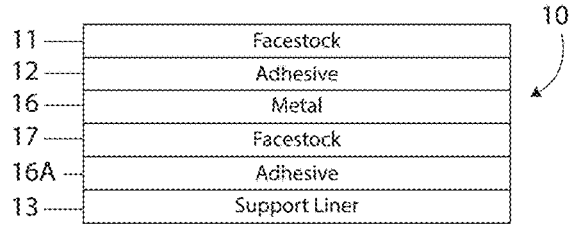
FIG. 3D
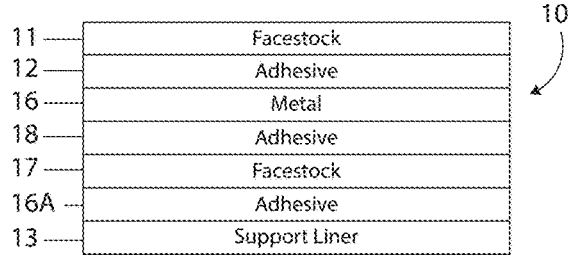
FIG. 3E
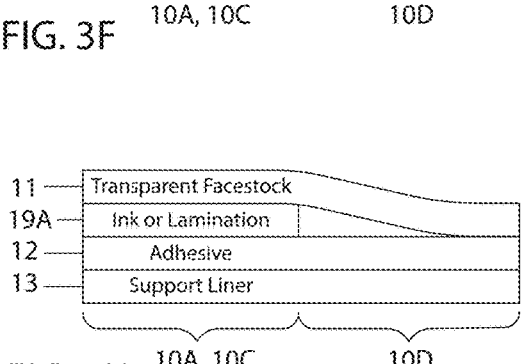
FIG. 3F
FIG. 3H
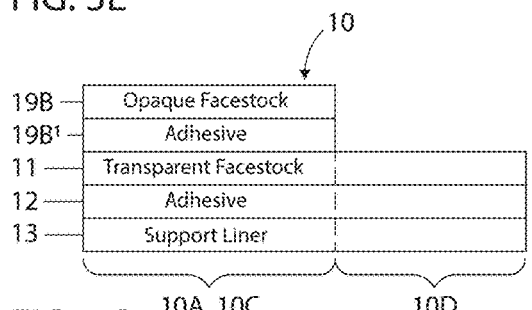
FIG. 3G
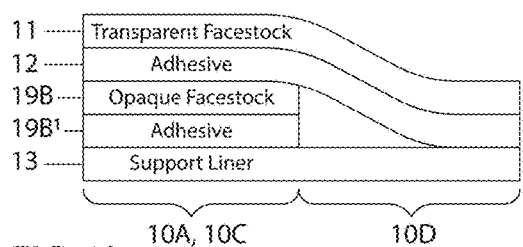
FIG. 3I

LABEL SYSTEM AND METHOD FOR LABELLING PRE-IDENTIFIED MICROSCOPE SLIDES

CROSS-REFERENCE TO RELATED APPLICATION

The present application claims the priorities of U.S. Patent Application No. 63/492,616, filed on Mar. 28, 2023, and of U.S. Patent Application No. 63/499,593, filed on May 2, 2023, the contents of both of which is incorporated herein by reference.

TECHNICAL FIELD

The present application relates to labels for use with microscope slides, in a process of relabelling pre-identified microscope slides.

BACKGROUND

Typical microscope slides are processed with labels containing information related to the histology/cytology sample with the originating patient information. However, slides are often sent to consulting facilities that must re-process the information to ensure compatibility with digital scanners and databases. Accordingly, microscope slides must occasionally be relabelled to cover existing 2D barcodes while, at the same time, adding new information that allows the proper recording of data via a new unique barcode.

The relabelling may be time-consuming, may be error prone, and requires some dexterity from the laboratory staff. Moreover, the barcode from the originating facility is often placed at a location within the label that varies from one facility to another, therefore there is a need for a flexible solution where the label can selectively obscure the barcode that may appear at an uncontrolled position within the label. Moreover, once the slide scanning and consultation process is complete, there may be a need to return the slides and restore the original information, therefore the over-label must be removable and not harm the printout underneath once removed.

SUMMARY

It is an aim of the present disclosure to provide a novel label system for objects such as microscope slides.

Therefore, in accordance with a first aspect of the present disclosure, there is provided a method for applying a label system onto a microscope slide, comprising: adhering a cover label portion of a label system over an existing identification of the microscope slide, whereby the cover label portion covers the existing identification; separating a main label portion from the cover label portion while the cover label portion remains on the existing identification; and adhering the main label portion onto the microscope slide.

Further in accordance with the first aspect, for instance, including removing a first liner portion from the cover label portion and keeping a second liner portion on the main label portion prior to adhering the cover label portion against the microscope slide, and removing the second liner portion from the main label portion prior to adhering the main label portion against the microscope slide.

Still further in accordance with the first aspect, for instance, including inscribing or printing data on the label system.

Still further in accordance with the first aspect, for instance, separating the main label portion from the cover label portion includes separating the main label portion from the cover label portion at a neck portion.

Still further in accordance with the first aspect, for instance, separating the main label portion from the cover label portion at the neck portion includes tearing the neck portion.

Still further in accordance with the first aspect, for instance, separating the main label portion from the cover label portion includes applying a tearing force between the main label portion and the cover label portion.

Still further in accordance with the first aspect, for instance, including removing the cover label portion from the microscope slide after use.

Still further in accordance with the first aspect, for instance, including adhering a transparent shield portion onto the existing identification of the microscope slide prior to adhering the cover label portion on the existing identification, and wherein adhering the cover label portion over the existing identification of the microscope slide includes adhering the cover label portion onto the shield portion.

Still further in accordance with the first aspect, for instance, including separating the shield portion from a remainder of the label system while the shield portion remains on the existing identification.

Still further in accordance with the first aspect, for instance, separating the shield portion from the remainder of the label system includes applying a tearing force between the shield portion and the remainder of the label system.

Still further in accordance with the first aspect, for instance, the label system includes a detectable metal, and further including exposing the microscope slide to a metal detection step when the microscope slide is in a waste device.

Still further in accordance with the first aspect, for instance, the label system includes a wireless communication chip capable of reading or encoding by a wireless communication reader/encoder.

In accordance with a second aspect, there is provided a label system for microscope slide comprising: a facestock configured to have data on a first surface thereof, and an adhesive layer on a second surface of the facestock, wherein the label system defines a cover label portion and a main label portion, separable from the cover label portion, the cover label portion configured to cover an existing identification on the microscope slide, the main label portion having identification data, the identification data differing from the existing identification, the main label portion configured to be adhered to the microscope label at a position differing from that of the cover label portion.

Further in accordance with the second aspect, for instance, the cover label portion has a generally circular shape.

Still further in accordance with the second aspect, for instance, the cover label portion has a diameter of at most 25.4 mm.

Still further in accordance with the second aspect, for instance, the main label portion has a generally rectangular or square shape.

Still further in accordance with the second aspect, for instance, corners of the main label portion in the generally rectangular shape are rounded.

Still further in accordance with the second aspect, for instance, the main label portion has a maximum width a ranging from 3.0 mm to 25.4 mm.

Still further in accordance with the second aspect, for instance, the main label portion has a maximum width ranging from 3.0 mm to 100.0 mm.

Still further in accordance with the second aspect, for instance, the main label portion is wider than the cover label portion.

Still further in accordance with the second aspect, for instance, the label system has a tear line transverse to a length thereof.

Still further in accordance with the second aspect, for instance, further including a neck portion between the cover label portion and the main label portion, the neck portion being narrower than the cover label portion and the main label portion.

Still further in accordance with the second aspect, for instance, the neck portion is narrower than the cover label portion by having a minimum width being between 10% to 80% of a width of the cover label portion.

Still further in accordance with the second aspect, for instance, the neck portion has a constant width from the cover label portion to the main label portion.

Still further in accordance with the second aspect, for instance, the neck portion flares from the cover label portion to the main label portion.

Still further in accordance with the second aspect, for instance, at least a portion of the second surface of the neck portion is with neutralized adhesive or is free of adhesive.

Still further in accordance with the second aspect, for instance, the cover label portion and/or the main label portion has a barcode, data and/or ink thereon.

Still further in accordance with the second aspect, for instance, data on the cover label portion differs from data on the main label portion.

Still further in accordance with the second aspect, for instance, the data on the cover label portion is a 1D barcode and/or 2D barcode, and wherein the data on the main label portion is a 1D barcode and/or a 2D barcode.

Still further in accordance with the second aspect, for instance, further including a support liner, the adhesive layer being between the facestock and the support liner, for releasable connection of the facestock to the support liner.

Still further in accordance with the second aspect, for instance, the support liner is adhered to another support liner by another layer of adhesive in a piggy-back configuration.

Still further in accordance with the second aspect, for instance, the support liner has a first liner portion and a second liner portion separated by at least one slit.

Still further in accordance with the second aspect, for instance, the slit is a continuous slit in the support liner in a direction transverse to a length of the label system.

Still further in accordance with the second aspect, for instance, the at least one slit is opposite the main label portion.

Still further in accordance with the second aspect, for instance, including a metallic layer.

Still further in accordance with the second aspect, for instance, the metallic layer is detectable by a metal detector.

Still further in accordance with the second aspect, for instance, the label system further defines a shield portion separable from a remainder of the label system, the shield portion being transparent or translucent while at least the cover label portion is opaque, the shield portion configured to cover the existing identification on the microscope slide, such that the existing identification is visible through the shield portion, the cover label portion configured to be adhered onto the shield portion.

Still further in accordance with the second aspect, for instance, the label system includes an ink, a lamination and/or another facestock to provide opaqueness to at least the cover label portion, the shield portion being free of the ink, lamination and/of the other facestock.

In accordance with a third aspect, there is provided a kit comprising the label system as above, and a label remover having a facestock defining a holding portion and an adhesive portion, the label remover configured to adhere to the cover label portion to remove same from a microscope slide. The kit may include at least one of a microscope slide, printing ribbon or ink, printer.

In accordance with a fourth aspect, there is provided a method for removing a cover label from a microscope slide, comprising: positioning an adhesive portion of a label remover onto a cover label portion of a label system covering an existing identification of the microscope slide, whereby the cover label portion covers the existing identification; applying a pressure on the adhesive portion of the label remover to press same against the cover label portion; and separating the label remover from the microscope slide, such that the cover label portion is detached from the microscope slide.

BRIEF DESCRIPTION OF THE FIGURES

FIG. 3A is a schematic sectional view of an exemplary construction of the label system of FIGS. 1A-1E, in accordance with an embodiment of the present disclosure;

FIG. 3B is a schematic sectional view of an exemplary piggy-back construction of the label system of FIGS. 1A-1E, in accordance with an embodiment of the present disclosure;

FIGS. 3C to 3E are schematic sectional views of exemplary constructions of the label system of FIGS. 1A-1E, incorporating a metallic layer in accordance with an embodiment of the present disclosure;

FIGS. 3F to 3I are schematic sectional views of exemplary constructions of the label system of FIGS. 1F-1H.

BRIEF DESCRIPTION OF THE EMBODIMENTS

Figure 2A:
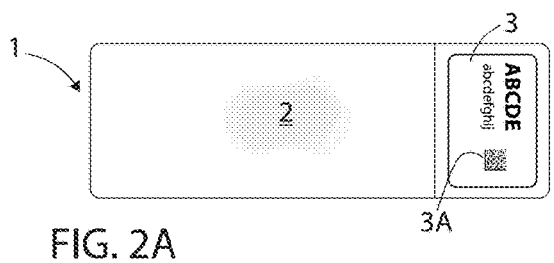
FIGS. 2A-2F are a series of views showing a method for labelling pre-identified microscope slides, using as an example the label system of FIG. 1A.

Referring to the drawings and more particularly to FIG. 2A, a typical microscope slide is generally shown at 1. Most commonly used microscope slides are made of glass but there are some made of plastic, and the label set described herein can be used with both types of microscope slides. Most commonly used dimensions of microscope slides are approximately 3"×1" although microscope slides may be as large as approximately 7"×5". Some examples of dimensions of larger slides are approximately 3"×2", 4"×3", 4"×3.25", 5"×4", 6"×4.5", 7"×5". For the sake of the present disclosure, the term microscope slide means any glass or plastic slide of any dimensions that is appropriate for examination of a sample under microscope, with the label set described herein usable with any such microscope slide. The microscope slide 1 may have a biological sample 2 thereon, along with a label 3 having patient data associated with biological sample 2. The patient data may take various forms, including alphanumeric data as shown in the form of two rows of text in FIG. 2A. The patient data may also have a scanning code, shown in FIG. 2A as being a barcode such as 1D barcode or linear barcode (e.g., code 39, code 128, code 11, code 93, ISBT 128, Codabar, ITF, MSI Plessey, EAN 8, EAN 13, UPC-A, UPC-E, Industrial 2 of 5, Interleaved 2 of 5, etc.), 2D barcode (e.g., QR code, DataMatrix, Aztec code, PDF417, MaxiCode, GS1 composite code, Han Xin Code, Dot code, Micro QR code, Quick Mark code, Grid Matrix code, etc.), 3D barcode (e.g., Bokode, HCCB, etc.). The scanning code could also be any of 1D barcode, 2D barcode, 3D barcode, UDI (Unique Device Identification) barcode, ISBT128, or any other type of barcode or scan code that can be scanned by any type of scanning device. The label 3 may comprise a RFID or NFC chip, or similar wireless communication device. The patient data may also be in other forms which may include numeric, alphanumeric, GS1 AI encodable, Full ASCII. The disclosure that follows pertains to a label system 10 that is configured to label the microscope slide 1 of FIG. 2A, by covering the existing barcode fully or partially to render it non-scannable by a barcode scanner that is appropriate for scanning the said barcode or unreadable by RFID/NFC or like wireless signal scanner if a complementary chip is present, and providing a new code that is in conformity with the requirements of a third party, such as a consulting facility, a different laboratory, etc.

Figure 1A:
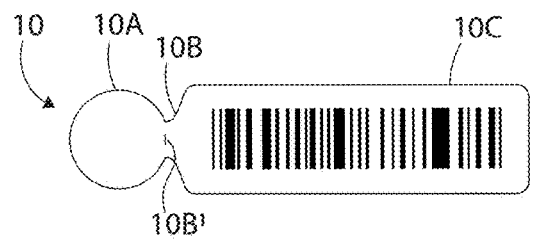
FIG. 1A is a top view of a label system for labelling pre-identified microscope slides, in accordance with a first variant of the present disclosure.
Figure 1B:
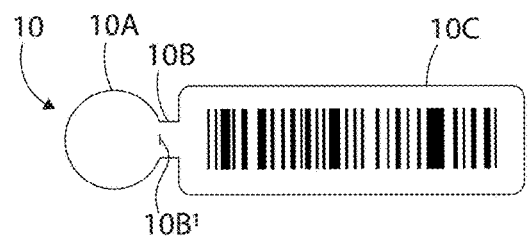
FIG. 1B is a top view of a label system for labelling pre-identified microscope slides, in accordance with a second variant of the present disclosure.

Referring concurrently to FIG. 1A, a label system 10 for microscope slide 1 is shown on its own. The expression "label system" is used herein, due to the fact that the item 10 separates into different labels or label portions. However, the label system 10 could also be referred to as a label. The label system 10 may have a monolithic or monoblock construction, but may have different parts, such as a cover label portion 10A, a neck 10B, and a main label portion 10C. Various implementations without neck portion 10B are contemplated, as described below, as shown in FIGS. 1D and 1E.

The cover label portion 10A is configured to be adhered to the label 3 of the microscope slide 1, so as to cover up the scan code that is on the label 3, and/or to cover any other information on the label 3. In an embodiment, the cover label portion 10A may be said to be circular, though it may be more appropriate to qualify the cover label portion 10A as being quasi-circular as it is tied to the neck 10B and therefore does not describe a full 360-degree circle. The cover label portion 10A may have other shapes, including square, rectangle, triangle, polygon, oval, semi-circle, semi-oval, semi-polygon, or a combination of shapes, etc any geometrical shape, non-geometrical shape, symmetrical shape, asymmetric shape, non-defined shape or any shape that enable the cover label portion 10A to be used to cover a scanner code when applied to the existing label or existing identification of the microscope slide 1. In an embodiment, the cover label portion 10A has a diameter ranging from 1.0 mm to 26.0 mm, this range applying to the largest cross-sectional dimension if the cover label portion 10A is not circular or quasi-circular. In an embodiment, the cover label portion 10A has a diameter ranging from 3.0 mm to 25.4 mm, this range applying to the largest cross-sectional dimension if the cover label portion 10A is not circular or quasi-circular. In an embodiment, the cover label portion 10A has a diameter ranging from 4.0 mm to 24.0 mm, this range applying to the largest cross-sectional dimension if the cover label portion 10A is not circular or quasi-circular. In an embodiment, the cover label portion 10A has a diameter ranging from 5.0 mm to 13.0 mm, this range applying to the largest cross-sectional dimension if the cover label portion 10A is not circular or quasi-circular. In an embodiment, the cover label portion 10A has a diameter ranging from 6.0 mm to 10.0 mm, this range applying to the largest cross-sectional dimension if the cover label portion 10A is not circular or quasi-circular. In an embodiment, the cover label portion 10A may have dimensions up to 25.4 mm×25.4 mm, such as based on dimensions of microscope slides, and it can be of any shape. Larger dimensions may be used for larger microscope slides such as 4"×3" or 7"×5".

In an embodiment, the cover label portion 10A may be blank. However, any type of data may optionally be provided on the cover label portion 10A, such as symbols, letters and/or numbers. The data may be pre-printed, or may be printed in situ, or may be etched. If present, the data on the cover label portion 10A may differ from the data on the main label portion 10C. For example, the data on the cover label portion 10A, 10B and/or 10C may be a QR code, 1D barcode, 2D barcode, 3D barcode with or without human readable and/or alphanumeric data. The data on the label portions 10A and 10C may be static (identical data on each label) or variable (i.e., different data on each label). The data may originate from a database, spreadsheet or from any computer driven software or from any electronic device including mobile phone, handheld device, etc. The data can be sequential, random, or any combination of variable and/or static data. Other data pairings are possible, including on the neck portion 10B. Furthermore, any portion of the label system 10 may have printing such as a logo, trade name, or any image or graphic alone or together with data or information or any indicia.

The neck 10B joins the cover label portion 10A to the main label portion 10C. In the embodiment of FIG. 1A, the neck 10B flares from the cover label portion 10A to the main label portion 10C, in a straight flare or in an arcuate flare. The outline of the neck 10B connecting the rectangular portion (i.e., main label portion 10C) and the circular portion (i.e., cover label portion 10A) may have an arcuate shape (i.e., no sharp angle) so as to adjust the force necessary to separate the main label portion 10C from the cover label portion 10A. The neck 10B may also be straight, as in FIG. 1B. At the junction with the cover label portion 10A, the neck 10B has a width smaller than the diameter of the cover label portion 10A (or maximum cross-sectional dimension). This width at the junction may be the smallest width of the neck 10B, and of the label system 10 altogether. In an embodiment, the width of the neck 10B at the junction with the cover label portion 10A may be between 1.0 mm and 5.0 mm. In an embodiment, the width of the neck 10B at the junction with the cover label portion 10A is from 10% to 80% of the diameter of the cover label portion 10A (or maximum cross-sectional dimension, or width of the cover label portion 10A, i.e., in direction W). In the illustrated embodiment the edges of the neck 10B may be straight, from the cover label portion 10A to the main label portion 10C, as in the variant of FIG. 1B. Other shapes are considered, such as arcuate, with a non-linear increasing slope from the cover label portion 10A to the main label portion 10C. The non-linear increasing slope may be exponential in shape, from the cover label portion 10A to the main label portion 10C. At a junction between the neck 10B and the main label portion 10C, the edges of the label system 10 may form obtuse angles, the obtuse angles being in the facestock of the label system 10. In an embodiment, the obtuse angles are between 110 degrees and 160 degrees. In an embodiment, the junction between the neck 10B and the main label portion 10C may have an angle between 90 degrees and 160 degrees. In another embodiment, the junction between the neck 10B and the main label portion 10C may have an angle between 45 degrees and 160 degrees.

Figure 1C:
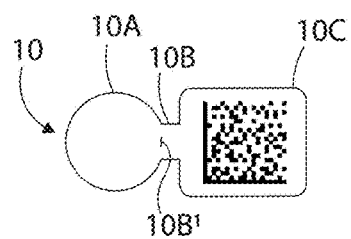
FIG. 1C is a top view of a label system for labelling pre-identified microscope slides, in accordance with a third variant of the present disclosure.
Figure 1D:
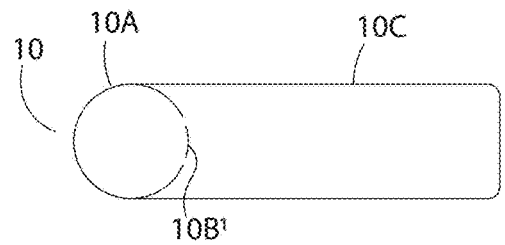
FIG. 1D is a top view of a label system for labelling pre-identified microscope slides, in accordance with a fourth variant of the present disclosure.
Figure 1E:
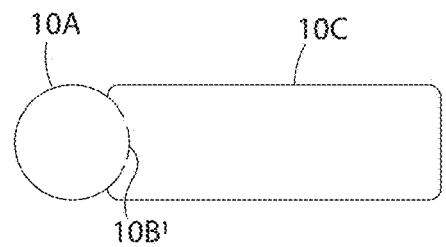
FIG. 1E is a top view of a label system for labelling pre-identified microscope slides, in accordance with a fifth variant of the present disclosure.

The main label portion 10C may be generally rectangular or square, or have such an elongated shape (e.g., oval), with FIG. 1C exhibiting an exemplary shorter version of the main label portion 10C. The main label portion 10C may have a conical shape (i.e., frusto-conical) meaning the free end is wider than the connected end (i.e., at the junction 10C/10B). The main label portion 10C may have rounded corners as shown, but the corners may be square (straight, 90° angle), etc. In an embodiment, the radius of the rounded corners is between 0.397 mm (1/64") to 19.05 mm (3/4"). In an embodiment, the radius of the rounded corners is between 0.794 mm (1/32") to 3.175 mm (1/8"). The main label portion 10C is configured to adhere to the label 3 on the microscope slide 1, or onto the microscope slide 1 itself or partially on label 3 and partially on the microscope slide 1. In an embodiment, the main label portion 10C has a width W (a.k.a., maximum width) ranging from 3.0 mm to 40.0 mm. In an embodiment, the main label portion 10C has a width W (a.k.a., maximum width) ranging from 5.0 mm to 25.4 mm. In an embodiment, the main label portion 10C has a width W (a.k.a., maximum width) ranging from 6.0 mm to 25.1 mm. In an embodiment, the main label portion 10C has a width W (a.k.a., maximum width) ranging from 6.3 mm to 24.0 mm. In an embodiment, the width W is greater than the diameter of the cover label portion 10A, or largest cross-sectional dimension if the cover label portion 10A is not circular or quasi-circular.

While the embodiments show that an axis of symmetry may be present for the outer shape of the label system 10 (horizontal on the drawing sheets), there may be no such symmetry. In an embodiment, any type of data may be provided on the main label portion 10C, such as barcode(s), symbols, letters and/or numbers, or any combination thereof. FIGS. 1A and 1B show a 1D barcode, while FIG. 1C shows a more compact label portion 10C, with a DataMatrix (2D barcode). The label may be opaque, transparent, translucent, hazy or have any degree of opacity, transparency, translucency or haziness or any combination thereof. In a variant, at least the cover label portion 10A is opaque so as to cover the data on the label 3. The label may have a background color, ink including but not limited to any type of ink used in commercial printing, or non-commercial printing, or in label printing or in data printing, or any ink delivered by any type of printing equipment, a chromic ink, thermochromic ink, sublimation ink, metallic ink, indicator ink, security ink, glow in the dark ink, nano-ink, any coating, ink-receptive coating, top-coating, protective coating, foil stamping, varnish or lamination. In some embodiments, the label 10 or any portion thereof may not be opaque, but may have the ability to prohibit the scanner from scanning the barcode 3A through the label 10.

By having a portion narrower than the cover label portion 10A and than the main label portion 10C, the neck 10B may exhibit a greater flexibility than the cover label portion 10A and main label portion 10C. Stated differently, the neck 10B may offer a lesser resistance to deformation, and may be more easily torn. The neck 10B could for instance have a tear line 10B' (a.k.a., tear strip) to tear when the label system 10 is being applied to the microscope slide 1. The tear line 10B' may be a series of perforations in the neck 10B (if present), or in the cover label portion 10B and/or the main label portion 10C or a junction thereof, or a single cut into the facestock in 10B, like weakening of the facestock, to enable the manual tearing of the label system 10 at the neck 10B. Snapping could also be the manual action performed to detach the main label portion 10C from the cover label portion 10A (or vice-versa). By snapping, the user exerts a pull, and the line 10B' or weakening in the facestock can cause the separation. The tear line 10B' may be at other locations. The tear line 10B' may be in any of the embodiments of the label system 10 described herein.

For example, referring to FIGS. 1D and 1E, two variants of the label system 10 are shown, in which the label system 10 is without any neck 10B. In such variants, the tear line 10B' separates the cover label portion 10A from the main label portion 10C. The variants of FIGS. 1D and 1E are merely two examples among others in terms of possible shapes.

Figure 1F:
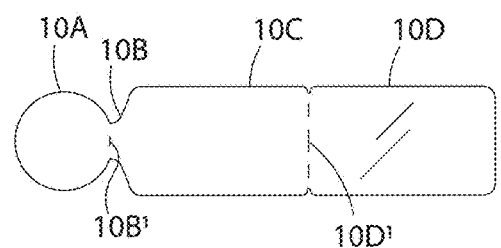
FIGS. 1F-1H are top views of a label system for labelling pre-identified microscope slides, with integrated shield, in accordance with other variants of the present disclosure.
Figure 1G:
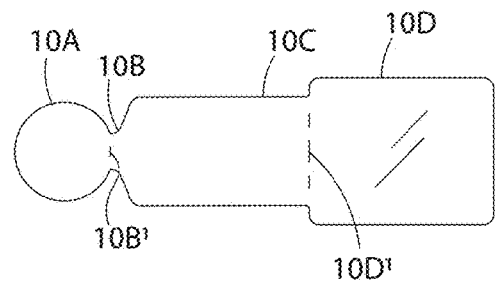
Figure 1H:
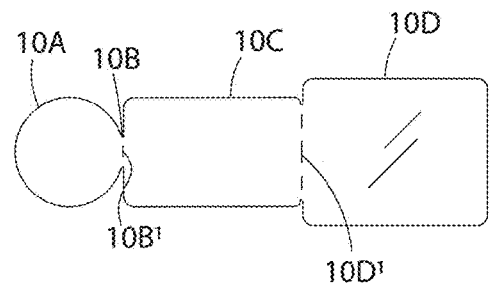

Referring to FIGS. 1F to 1H, the label system 10 may further include a shield portion 10D that is attached to a remainder of the label system 10, such as to the main label portion 10C. The shield portion 10D may be transparent and/or translucent, such that one can see through the shield portion 10D, for example if the shield portion 10D is positioned on top of the label 3 or on top of data printed directly onto the microscope slide 1 to laminate and protect the data on the pre-existing label 3. The shield portion 10D may be connected to the main label portion 10C or to the cover label portion 10A. In the illustrated embodiments of FIGS. 1F to 1H, the shield portion 10D and the cover label portion 10A are on opposite sides of the main label portion 10C, but this is only an option. However, such arrangement may facilitate manipulation, and may ensure that the label system 10 with shield portion is elongated and thus relatively compact. The shield portion 10D may have different shapes (i.e., not necessarily square or rectangle), and may be wider than the main label portion 10C, but this is again just an option, as it may be the same width (FIG. 1F), or even smaller. The shield portion 10D may be connected to a remainder of the label system 10 by way of a tear line 10D', or other tear-assist or separation assist feature, such as a neck equivalent to the neck 10B. The tear lines 10B' and/or 10D' may be optional. Shield portion 10D may have the same type of adhesive as the other portions of the label 10 or may have a different adhesive.

Thus, the label system 10 describes a configuration that is well suited to be used with pre-identified microscope slides, such as the one shown in FIG. 2A. However, other configurations of the label system 10 could be used, including one in which the label system 10 has a single, elongated shape (e.g., rectangular, with or without rounded corners) with the capacity to tear to define a cover label portion 10A and a main label portion 10C, the capacity to tear being optionally provided by a tear line such as 10B'. Hence, the label system 10 may be without a neck portion 10B.

Referring to FIG. 3A, the label system 10 may have various layers, all of which may extend from end to end of the label system 10, i.e., along a lengthwise direction projecting out of the page of FIG. 3A. Facestock 11 is the surface that can accept ink or printing, although the capability of accepting ink is not a requirement. This may include printing using a thermal printer, a thermal-transfer printer, a direct-thermal printer, a laser printer, an inkjet printer, UV-inkjet, water-based inkjet printer, LED printer, UV printer, copier, impact printer, dot-matrix printer, laser-etching printer, flexographic printer, offset printer or a printing press or any other type of printer or device capable of delivering ink on any of the surfaces of the label. This may also include any writing instrument including but not limited to any type of pen, pencil, permanent marker, marking pen, etc. Accordingly, the facestock 11 may incorporate a chromic ink, a thermochromic ink system (such as leuco dye), for example in a layer of coating that is part of the facestock or incorporated in the material of the facestock, for the color to be revealed upon heating. The facestock 11 itself may include one or more layers, including transparent and opaque layers, shielding layer(s), top coatings, inks, varnishes, laminations, wireless communication components such as RFID (Radio Frequency Identification), NFC (Near Field Communication), Bluetooth® and other types of wireless communication tags or a chip, sensor, electronic component, etc. In an embodiment, a wireless communication component(s) may be located under the adhesive layer 12 of the facestock 11.

The label systems 10 can be provided blank or pre-printed, and/or may be with any background color or color indicator such as thermochromic ink, and/or image, and/or information and/or barcode and/or alphanumeric markings, and/or indicia etc. The facestock materials can be made of a polymer, or of a paper such as an impregnated paper (e.g. latex impregnated paper). The facestock material(s) may include but is not limited to polymer(s) such as any type of thermoplastic film, any type of polypropylene (PP) of any density, biaxially oriented polypropylene (BOPP), oriented polypropylene (OPP), biaxially oriented polypropylene terephthalate (BOPET), polyethylene (PE), high density polyethylene (HDPE), low density polyethylene (LDPE), high density polyethylene (HDPE), polyester (PET), nylon (polyamide), polyolefin, polystyrene, vinyl, polyvinyl including polyvinyl chloride (PVC) and polyvinyl fluoride (PVF), acrylate, nylon, satin, polyethylene, polyimide, Tyvek® (flash-spun high density polyethylene fiber based), nanomaterials, composite materials, silicone, silicone rubber, rubber, synthetic rubber, latex, thermoset plastics, plastic extrusion materials, and may also include cloth tissues, woven or non-woven fabrics, foam, metallic layer, metallic foils such as aluminum foil, stainless steel foil, copper foil, magnetic or ferromagnetic materials, Velcro®, environmentally friendly materials, degradable and soluble materials including environmentally sustainable, biodegradable and bio compostable materials, nanomaterials. The facestock materials include paper and polymer composites or combinations, cloth and polymer composites or combinations, including layers of polymer and paper and/or cloth, such that the paper or cloth is for example laminated with plastic. Embossed, stamped foil, clear, opaque, transparent, translucent and/or reflective materials or any combination thereof may also be used for the facestock 11. In an embodiment, any combination of at least two of the facestock materials above is contemplated. In an embodiment any combination of at least two of the following is contemplated paper, plastic, metallic foil, magnetic film and cloth. The polymers may be thermoplastics or thermosoftening plastics, i.e., plastic polymers that soften or become moldable when heated to a certain threshold temperatures, to solidify upon cooling. The polymers may be thermoset plastics comprising cross-linked polymers to form an irreversible chemical bond and may become non-moldable when heated. The facestock 11 may be selected to have direct thermal printing capacity meaning that an ink system (e.g. leuco-dye) is incorporated inside the facestock 11 or in its top coating. The ink may then be released upon heating the facestock layer 11 such as by a thermal printer or a heat-emitting or heated instrument. The facestock 11 may be for example printed or coated with a non-reversible (e.g., leuco dye) or a reversible chromic or thermochromic ink system which may also be also incorporated inside or applied on the facestock or other constituent of the label system 10 such as onto the lamination or inside the adhesive. The use of a combination of printing methods is contemplated. All label systems 10 of the present disclosure may or may not accept writing by a pen, pencil, marker or any other instrument for inscribing or manual writing. Due to the fact that microscope slides may require storage in refrigerators, freezers or cryogenic environments, the label system 10 on a microscope slide may be capable of withstanding a storage in refrigerators, freezers, dry ice and liquid nitrogen tanks. In an embodiment, the label system 10 on microscope slide may withstand freezing from 0° C. to −20° C. In another embodiment, the label system 10 on microscope slide may withstand freezing from −10° C. to −85° C. In another embodiment, the label system 10 on microscope slide may withstand freezing from −20° C. to −150° C. In another embodiment, the label system 10 on microscope slide may withstand freezing from −40° C. to −196° C. In another embodiment, the label system 10 on microscope slide may withstand contact with dry ice and transportation on dry ice. In another embodiment, the label system 10 on microscope slide may withstand contact with vapor phase liquid nitrogen. In another embodiment, the label system 10 on microscope slide may withstand contact with liquid phase liquid nitrogen. Due to the fact that the label system 10 including when applied onto a microscope slide may come in contact with solvents and chemicals, the label system 10 and the printing thereon may be capable of withstanding contact with solvents and chemicals used in laboratories. In an embodiment, the label system 10 and the printing thereon on microscope slide may withstand exposure to alcohols. In another embodiment, the label system 10 and the printing thereon on microscope slide may withstand exposure to xylene and its substitutes. In another embodiment, the label system 10 and the printing thereon on microscope slide may withstand exposure to formalin. In another embodiment, the label system 10 and the printing thereon on microscope slide may withstand exposure to acids. In another embodiment, the label system 10 and the printing thereon on microscope slide may withstand exposure to basis. In another embodiment, the label system 10 and the printing thereon on microscope slide may withstand exposure to water. Due to the fact that in some instances the microscope slides may be sterilized, the label 10 on microscope slide may withstand high temperatures up to +150° C. In an embodiment, the label system 10 on microscope slide may withstand steam autoclaving.

In some variants, a thickness of the facestock 11 may be equal to or less than about 30.0 mil. More specifically, the label facestock 11 may have a thickness of between about 0.5 mil and 12.0 mil. More specifically, the label facestock 11 may have a thickness of between about 0.3 mil and 8.0 mil, and even more specifically, the facestock 11 may have a thickness of between about 0.4 mil and 4.8 mil, or of between about 0.8 mil and 3.5 mil, or still more specifically, of between about 0.9 mil and 3.2 mil. In a variant, the facestock 11 may be transparent or translucent, such that it may be possible to see through it. In such case, an additional water dissolvable layer 11A (a.k.a., water soluble) may be present to cover at least part of the facestock 11. For example, the cover label portion 10A has the water dissolvable layer 11A, while the main label portion 10C does not. The water dissolvable layer 11A may be opaque or translucent, to provide some concealing capacity as explained below. For example, the layer 11A of sodium carboxymethyl cellulose and wooden pulp, but other water soluble materials can be used. In another variant, there is no such water dissolvable layer 11A, but at least part of the facestock 11 is made or integrates a water dissolvable material such as sodium carboxymethyl cellulose and wooden pulp, which may or may not be combined with other water soluble composites and laminates. For example, the facestock 11 defining the cover label portion 10A integrates a water dissolvable material to be water soluble, while the facestock 11 defining the main label portion 10C does not. In a variant, all of the label 10 is water soluble.

An adhesive layer 12 may be coated on the underside of the facestock 11. A support liner or release liner 13 may also be provided upon which the label systems 10 are laid, from which the adhesive layer 12 with the facestock 11 can be released. In an embodiment, the label system 10 does not include the release liner 13, though it may come on the release liner 13. In another embodiment, the label system 10 may be linerless. The support liner 13 may have a surface coating (a.k.a., release coating) or any low adherence surface or feature (e.g., silicone, non-silicone release coating, wax, etc.), upon which the adhesive layer 12 is laid, to facilitate the separation of the facestock 11 and adhesive layer 12 from the support liner 13.

The adhesive in the adhesive layer 12 may be any type of adhesive including pressure-sensitive adhesives, and non-limitative examples include a water-based acrylic, an emulsion adhesive, a hot melt including a UV hot melt, UV acrylic, a rubber-based adhesive, a latex-based adhesive, a solvent-based adhesive, a silicon-based adhesive, a UV-curable adhesive, a LED-curable adhesive including a LED-UV-curable adhesive, a cross-linked adhesive, heat activated adhesive, heat-seal adhesives, adhesives for cold-stamping or hot-stamping, any combination thereof, etc. Similarly, in a variant, the adhesive can be permanent, while in another scenario, the adhesive can be removable and/or repositionable, allowing repositioning of the label system 10 on the surface to be labelled. The adhesive of the adhesive layer 12 can also be a glove-friendly removable adhesive, for example. In an embodiment, the adhesive of the adhesive layer 12 can be water-soluble or water dissolvable, such that the adhesive may be fully dissolved in water or in an aqueous solution within seconds or within a few minutes (e.g., depending on desired characteristic). In an embodiment, the adhesive of the adhesive layer 12 can be environmentally friendly, biodegradable or biocompostable, or any degree of biodegradability or biocompostability. It is noted that any pressure-sensitive adhesive could be used. In some implementations, the adhesive of the adhesive layer 12 can be weakened or even neutralized at one or more locations using any adhesive neutralizing agent such as a varnish, an ink or UV varnish, a UV ink or the like. In some implementations, the adhesive 12 can be applied according to a certain pattern covering only a portion of the facestock 11 such that a remaining portion of the facestock undersurface is devoid of any adhesive. For example, the neck portion 10B with or without some adjacent areas could be without adhesive or with neutralized adhesive. In an embodiment, the adhesive of the label 10 allows the removal or repositioning of the label portion 10A and 10C after the microscope slide examination in order to reveal the original information on the label 3. In an embodiment, the adhesive 12 is easily removable from a surface of thermoplastic films and/or paper.

The adhesive layer 12 may have a thickness equal to or less than about 10.0 mil. More specifically, the adhesive layer 12 could have a thickness of between about 0.05 mil and 2.0 mil, and even more specifically, the adhesive layer 12 could have a thickness of between about 0.4 mil and 1.5 mil, or of between about 0.6 mil and 1.2 mil, or still more specifically, of between about 0.7 mil and 1.0 mil or still more specifically, of between about 0.2 mil and 0.6 mil.

In a variant, adhesive neutralization or adhesive free area may be present in the neck 10B. In such a case, the portion of the neck 10B that remains with the cover label portion 10A when the latter is applied to the microscope slide 1 can serve as a pulling tab to facilitate the removal of the cover label portion 10A from the microscope slide 1, if desired after use. There may hence result a tab facilitating the removal. The adhesive neutralization of the adhesive zone could also be under part of the cover label portion 10A and/or label portion 10C to facilitate the removal of 10C.

The release liner 13 may be paper based, or polymer based, with contemplated polymers including a polyester (PET), polypropylene, bi-axially oriented polypropylene (BOPP) or any other type of a polymer. For example, the release liner 13 may be a silicone or fluorosilicone coated support on which the adhesive layer 12 is harboured or retained, though other materials can be used, including waxes or other adhesive release coatings, etc, on a substrate. For example, if the support liner 13 is paper based, a low friction coating (e.g., silicone, fluorosilicone, UV silicone, or non-silicone based release coating) may be present to facilitate the peeling off of the facestock 11 and adhesive layer 12 from the support liner 13. Some examples of non-silicone based coatings may include fluoropolymer-based coatings such polytetrafluoroethylene (PTFE) and polyvinylidene fluoride (PVDF); acrylic based release coatings; such as solvent based, water-based, emulsions, dispersions; polyurethane-based release coatings which may be solvent-based or water based; wax-based release coating which may be solvent-based or water based; polymer-blend release coatings which are combinations of different polymers that can be tailored to achieve the desired release performance and compatibility with various adhesives such as blends of acrylics, urethanes, fluoropolymers, etc.

Accordingly, when the release liner 13 is removed, the facestock 11 may be adhered to the microscope slide surface (including on the label 3 or on the shield portion 10D placed over label 3), by the adhesive layer 12. In another embodiment, the release liner 13 may have imaging properties meaning that the manual writing with a pen or a pencil or with any type of impact instrument or impact printer can create a copy of the image on the release liner 13. In this case, when the facestock 11 is removed from the liner 13, the copy of the printed information or the image remains on the release liner 13 similar to carbon-copying. In another embodiment, the label system 10 has a paper based facestock and a paper-based release liner 13. In another embodiment, the label system 10 has a paper based facestock and a polymeric release liner 13. In another embodiment, the label system 10 has a polymeric facestock 11 and a paper-based release liner 13. In another embodiment, the label system 10 has a polymeric facestock 11 and a polymeric release liner 13. In another embodiment, the polymeric facestock 11 has an elongation value over 10% in either Machine Direction (MD) or Traverse Direction (TD) prior to breaking as measured according to ASTM D-882A (American Standard Testing Method). In another embodiment, the polymeric facestock 11 has an elongation value over 40% in either Machine Direction (MD) or Traverse Direction (TD) prior to breaking as measured according to ASTM D-882A. In another embodiment, the polymeric facestock 11 has an elongation value over 80% in either Machine Direction (MD) or Traverse Direction (TD) prior to breaking as measured according to ASTM D-882A.

In an embodiment, as shown in FIG. 3B the label may have additional layers such as an additional adhesive layer 14 and an additional support liner 15, in what may be known as a piggy-back label configuration. In the piggy-back configuration, the facestock 11 and optional water dissolvable layer 11A, adhesive layer 12, support liner 13 and adhesive layer 14 may be concurrently separated from the support liner 15.

In some instances, the microscope slide 10 having thereon the label system 10 may be configured to be detected by a detection system for detecting microscope slides to avoid an accidental loss. Accordingly, the label system 10 may have a metal component, such as a metal layer, that may be inserted or may be a layer in the label system 10. As shown in FIGS. 3C, 3D and 3E, the label system 10 may include a metallic layer 16. The metallic layer 16 may be aluminum foil, copper foil, steel foil or any other type of metallic foil, a composite with metallic particles, or like layer or alloy including magnetic or ferromagnetic material that may be detected by a metal detector, scanner or equivalent equipment to reveal the presence of a metal. In FIG. 3C, the metallic layer 16 is between adhesive layers 12 and 16A, so as to be adhered to the facestock 11 and releasably adhered to the support liner 13. In FIG. 3D, the metallic layer 16 may be laminated, coated, fused, sealed, heat-sealed or connected in any appropriate way to another facestock 17. In FIG. 3E, another adhesive layer 18 is present, between the metallic layer 16 and the other facestock 17. The assembly of the metallic layer 16 and facestock 17 of FIGS. 3D and 3E may be releasably adhered to the support liner 13, by adhesive layer 16A, as a possibility. In all of the embodiments described herein, it is considered to use a heat seal between metallic layer 16 and facestock 11 and/or 17 (if present). For example, the heat seal may be used instead of the adhesive layer 12 in FIGS. 3C,3D and 3E, and instead of the adhesive layer 18 in FIG. 3E. Other configurations are possible.

The metal component or layer 16 may be detectable by metal detectors or like detection devices to identify the presence of objects containing metal. In a variant, the facestock 11 may be or may include a metal foil such as For example, the scanning/detecting may involve magnetic fields, radiation such as X-Ray, or other scanning modalities. The detection may be signalled in various forms such as audio, video, vibration or any other type of signal. In an embodiment, the metal foil is laminated with a $2^{nd}$ facestock using a pressure-sensitive adhesive or a non-pressure sensitive adhesive or a heat-seal or other method of fusion of metal to a thermoplastic or thermoset film, or paper, or any other type of facestock used in packaging or label manufacturing. In an embodiment, the metallic layer 16 may be laminated on a laminating equipment that may be part of a flexographic press or other type of material manufacturing machine. In another embodiment, the metal component is inserted by a device such as an RFID insertion equipment or similar equipment capable of inserting a tag or a label into another label. In some instances, the existing label 3 may include an electronic chip (e.g., RFID or NFC tag) for wireless scanning, reading or encoding, instead of or in addition to printed information thereon. In such a case, the metal component (such as the metallic layer 16) of the label system 10 may have the capacity of disrupting or interfering with the wireless signal from wireless chip on the existing label 3. In yet another variant, the label system 10 may include an electronic chip (e.g., RFID or NFC tag) or any other wireless communication component, which may have a Unique Identifier (UID) encoded by chip manufacturer or additional information encoded by the user, the electronic chip being detectable, readable, scannable and/or writable by wireless readers such as RFID, NFC reader/encoders or Bluetooth, and/or metal detectors as well. Such a label may be used for wireless identification of the relabelled slides.

FIGS. 3F to 3I are schematic sectional views of exemplary constructions of the label system of FIGS. 1F-1H, i.e., with the shield portion 10D. As observed from FIGS. 1F-1H, the label system 10 has its cover label portion 10A and its main label portion 10C in an opaque configuration, as these label portions 10A and 10C will cover and conceal the existing label 3 (i.e., the cover label portion 10A), and may bear data (i.e., the cover label portion 10A and/or the main label portion 10C). On the other hand, the shield portion 10D is optionally present to cover the existing label 3 and/or data printed directly on the microscope slide 1, so as to protect it or them during the removal of the cover label portion 10A. Indeed, the adhesive on the cover label portion 10A could tear the existing label 3, or remove ink depending on the quality of the ink and the material of the existing label 3, or adherence of the ink to the microscope slide material. In the variant of FIG. 3F, the entire facestock 11 is transparent or translucent. An ink or lamination 19A may be provided on top of the facestock 11, to give that part of the label system 10 (corresponding to the cover label portion 10A and to the main label portion 10C) its opaqueness. In FIG. 3G. the opaqueness is provided by an opaque facestock 19B, that may be adhered to the transparent facestock 11 by an adhesive layer 19B', as an option among others. In FIG. 3H, the ink or lamination 19A may be under the transparent facestock 11, with the facestock 11 having the capacity of receiving and holding ink. In FIG. 3I, the opaque facestock 19B may be under the transparent facestock 11, with the facestock 11 having the capacity of receiving and holding ink. These are examples among others of constructions in which the label system 10 may have a transparent shield portion 10D.

Now referring to FIGS. 2A-2F, a method for labelling a pre-identified microscope slide 1 is described. The microscope slide 1 is said to be pre-identified as it already has a label 3 thereon (or data inscribed directly on the microscope slide 1), and may also have a sample 2 thereon. The label 3 may be said to be associated with a first entity or first party, and may contain patient data in any appropriate form, including a scanning code, shown as 3A in FIG. 2A. For the purpose of being treated or analyzed by another party, the microscope label 1 is to be relabeled, with at least part of the data on the label 3 being covered to prevent any misidentifying of the microscope slide 1 by the other party and using a new identification while the slide is in possession of the $3^{rd}$ party and making it apparent that the original label is there but that it should not be used or scanned until the processing of the slide is completed by the $3^{rd}$ party. The scanning code 3A may be any type of a code or barcode including (1D, 2D or 3D class of codes). More than one scanning code may exist on the label 3. In some facilities, microscope slide printers are used i.e., printing devices capable of printing directly on the microscope slides without using labels. Such printing devices may use different printing methods such as thermal-transfer, inkjet, laser, etc.). The present disclosure includes the use of the label 10 for microscope slides which are printed with any type of a slide printer, i.e., not necessarily with a label 3. In some instances when there are more than one barcode or more than one area to cover on standard microscope slides or on larger size microscope slides the label 10 may have more than one cover label portion 10A, neck portion 10B, main label portion 10C and/or shield portion 10D.

Figure 2B:
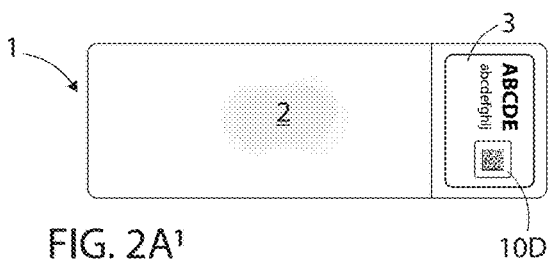
Figure 2B:
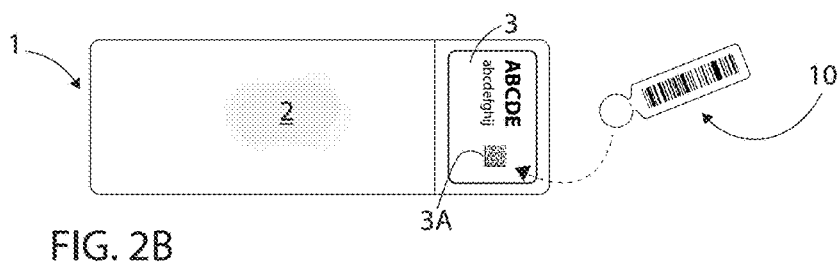

Referring to FIG. 2B, the label system 10 is manipulated toward the microscope label 1. The label system 10 may have had its release liner 13 removed. Stated differently, the label system 10 may have been detached from its release liner 13. It may also be said that the facestock 11 and adhesive layer 12 of the label system 10 are manipulated, or that the label system 10 without the release liner 13 is manipulated. Prior to FIG. 2B, and with reference to FIG. 2A', the shield portion 10D may have been applied onto the scanning code 3A, or other part of the existing label 3 or microscope slide 1 that needs to be shielded. In a variant, the whole label system 10 with shield portion 10D is moved toward the part of the microscope slide 1 to shield, with liner 13 removed beforehand, to uncover at least the shield portion 10D (and optionally the cover label portion 10A). The shield portion 10D may then be applied onto the existing label 3 or microscope slide 1, and torn off from a remainder of the label system 10. For example, a user can apply a pressure on top of the shield portion 10D while applying a tearing force at a junction of the shield portion 10D with a remainder of the label system 10. As a result, the shield portion 10D is separated from a remainder of the label system 10, and remains on the microscope slide 1 to shield part of it, in the manner shown in FIG. 2A'.

Figure 2C:
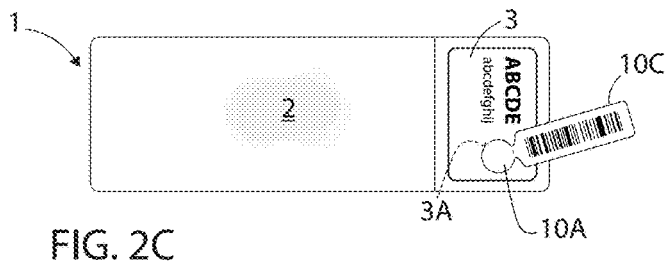

Referring to FIG. 2C, the cover label portion 10A is positioned on top of the scanning code 3A of the existing label 3, in such a way that at least part of the scanning code 3A is covered. By the covering of the scanning code 3A, it may be said that the scanning code 3A is no longer readable by a scanner or like scanning device. In a variant, a pressure is applied to the cover label portion 10A, to promote its adherence to the existing label 3. If a shield portion 10D has been applied in the manner shown in FIG. 2A', the cover label portion 10A is positioned on top of the shield portion 10D.

Figure 2D:
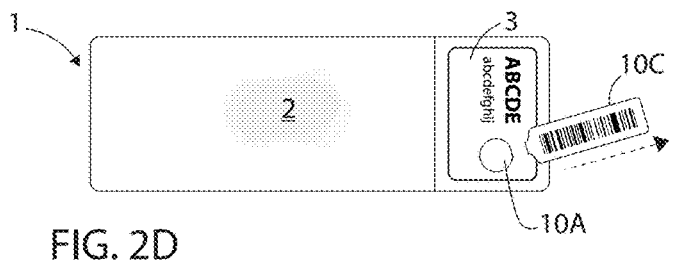

Referring to FIG. 2D, the main label portion 10C of the label system 10 is detached from the cover label portion 10A. In doing so, if the label system 10 has a neck portion 10B, the neck portion 10B may remain with the cover label portion 10A or with the main label portion 10C, or may be partly separated between cover label portion 10A and the main label portion 10C, depending on where the tear occurs (e.g., for example at the tear liner 10B' if present). In order to detach the main label portion 10C from the cover label portion 10A, one technique consists in maintaining a pressure on the cover label portion 10A while on the scanning code 3A, as in FIG. 2C, and simultaneously applying a force on the label system 10, such as at the neck portion 10B if present, on the tear line 10B' if present, to cause the separation. The applied force may be a tearing force, a shear force, a pulling force and/or a tensile force, as possibilities among others. There may result a pulling tab that is on the existing label 3 (e.g., part of the neck 10B remaining with the cover label portion 10A, for instance with neutralized adhesive or free of adhesive). In an embodiment, the force required to separate the label 10A from label 10 is above 0.5 Newton.

Figure 2E:
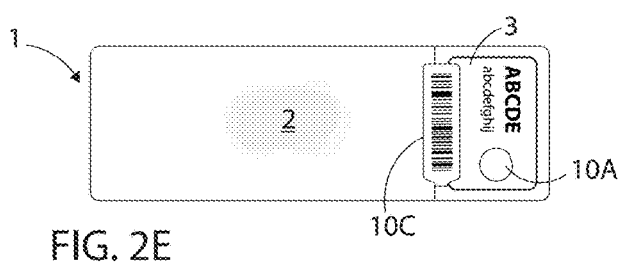

Referring to FIG. 2E, the main label portion 10C may then be applied on the microscope slide 1. This includes positioning the main label portion 10C on the existing label 3, on the slide body of the microscope slide 1, or on both, as shown by the overlapping of the main label portion 10C in FIG. 2E. The microscope slide 1 may be said to be in a relabeled condition in FIG. 2E, and may thus be processed by the other party. In the relabeled condition of FIG. 2E, it may be said that the label 3 is unavailable for scanning, non-scannable, inactive. The scan code of the main label portion 10C may become the only active scan code on the microscope slide 1, although additional scannable code(s) may be present on 10A, 10B and/or 10C portions as embodiments. In an embodiment, there may be more than one type of scan code/barcode on the label portions 10A, 10B and/or 10C. For example, any of the portions may have 1D and 2D barcodes existing next to each other which will allow scanning with either type of a scanner (1D or 2D scanner). Although in FIGS. 2A-2F the cover label portion 10A is shown covering a 2D barcode, the cover label portion 10A can similarly disrupt scanning of any 1D or other types of barcodes or like data, if it is placed over any portion of the 1D linear barcode and covers some of the bars.

Figure 2F:
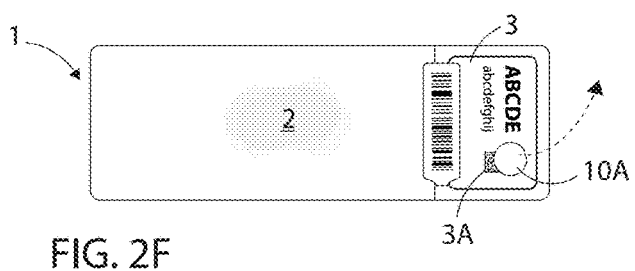

Referring to FIG. 2F, the cover label portion 10A may be removed at a later point, if the existing label 3 must be scanned. In a variant, the scan code types differ between the existing label 3 (e.g., shown as a Datamatrix code or 2D barcode) and the main label portion 10C (e.g., shown as a 1D barcode). In an embodiment, the code on the main label portion 10C may be a 2D barcode or combination of 1D and 2D. In an embodiment, there may be human readable information of the barcode displayed adjacent to the barcode at any location of the label set 10. In an embodiment, serialized number, random number, alpha-numeric number, or text information may be displayed on any portion of the label 10 along with any type of scan code/barcode or without scan code/barcode. The reverse arrangement is possible, and this is merely optional. The cover label portion 10A may be removed manually, for instance by pulling on the tab if present (e.g., part of the neck 10B remaining with the cover label portion 10A, for instance with neutralized adhesive or free of adhesive). In a variant, a tool may be required to remove the cover label portion 10A from its adhesion on the existing label 3. The tool may be a pointer, a pick, a blade, etc. In an embodiment, a highly removable or repositionable adhesive is used to allow easy removal of 10A and 10C without any need of neutralization of the adhesive or of adhesive-free zones. In some instances, the cover label portion 10A is removed to expose the shield portion 10D, which shield portion 10D remains on the microscope slide 1 and/or on the existing label 3. The shield portion 10D is transparent, such that the data it covers may be visible through the shield portion 10D.

Figure 4:
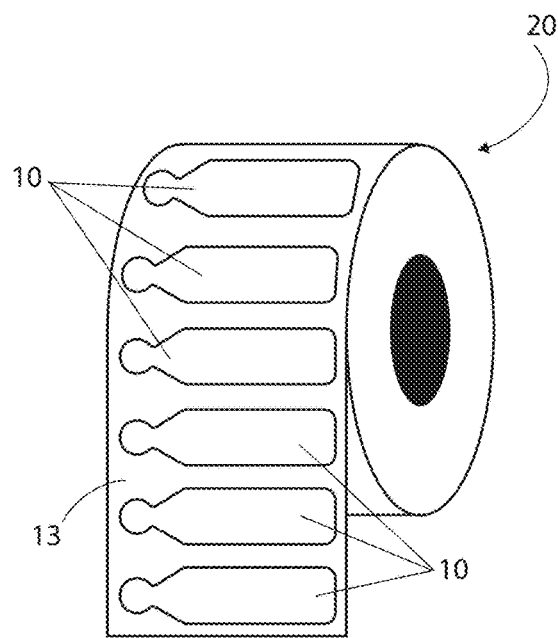
FIG. 4 is a perspective view of a series of the label system of FIGS. 1A-1E, in a roll in accordance with an embodiment of the present disclosure.

Referring to FIG. 4, a plurality of the label systems 10 are shown on a common release liner 13, the release liner 13 being in the form of a roll 20. In FIG. 4, perforations may be present in the neck portion, though not visible. In an embodiment, the facestock 11 covers all of the release liner 13 in the roll 20, with the label systems 10 being die-cut so as to be removable from the release liner 13. In such a case, a waste portion of facestock 11, defining contours of the label systems 10, would be present or may be removed. In an embodiment, the waste portion of the adhesive coated facestock 11 is removed around the label system 10. In another embodiment, the waste portion of the adhesive coated facestock 11 is removed only partially. In other embodiments, the release liner 13 may be in the form of a sheet (such as a letter size 8.5"×11" or A4, or other sheet format) with rows and columns of the label systems 10, or in the form of flat strips with rows of the label systems 10, booklet, fanfold, etc. In an embodiment, when the label systems 10 are intended for printing in a laser printer, a LED printer or any other type of printer in a sheet format, the release liner 13 may be resistant to heat without curling when it is passed through such a printer. Such release liners are also known as "layflat" liners. In some cases the layflat liners are thicker than regular release liners, and may be for example up to 7.0 mil in thickness. In an embodiment, similar type sheet configurations can be used for inkjet printers where no significant heat is exerted.

Figure 5:
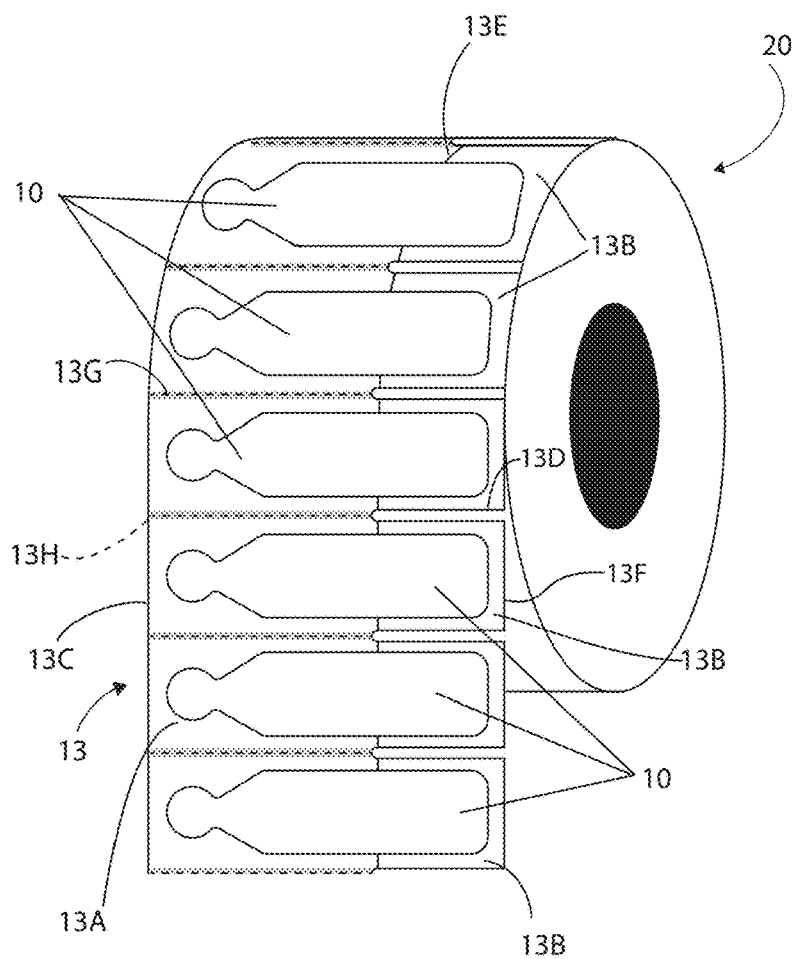
FIG. 5 is a perspective view of a series of the label system of FIGS. 1A-1E, in a roll with a two-part support liner, in accordance with another embodiment of the present disclosure.

Referring to FIG. 5, the plurality of label systems 10 in the roll 20 are shown with the liner 13 having a main liner portion 13A and a plurality of removable liner portions 13B, with each label system 10 overlapping a corresponding removable liner portion 13B, and the main liner portion 13A. The removable liner portions 13B can be positioned adjacent each other along a liner side edge 13F. A liner cut line may include notches 13D extending from the liner side edge 13F and creating gaps between adjacent removable liner portions 13B, or may include slits 13D' (FIG. 7) instead of notches 13D such that the adjacent removable liner portions 13B are contiguous to each other. The main liner portion 13A may be separated from the removable liner portions 13B by a slit 13E, such that the main liner portion 13A is not directly attached to the removable liner portions 13B, the label system 10 holding the liner portions 13A and 13B together. The slit 13E may be a continuous line, for instance die-cut in the liner 13. The slit 13E may be parallel to the liner side edges 13C and 13F, and may have other shapes. For example, the plurality of label systems 10 in the roll 20 as in FIG. 5 may be in accordance with U.S. patent application Ser. No. 17/092,719, the contents of which are incorporated herein by reference. Also, the main liner portion 13A and removable liner portion 13B can be positioned at any location on the roll 20 based on the preference of the user.

In an embodiment, as an alternative to a continuous slit 13E, webs of about 0.2 to 2.0 mm or less may be left to disrupt the slit 13E, but these are optional. In other words, the removable liner portions 13B would be connected to the main liner portion 13A by one or more small connecting webs of liner. In this implementation, the user would break these small connecting liner portions to separate the removable liner portion 13B from the main liner portion 13A. In an embodiment, the slit 13E may be present without having the 13D' cuts and without having removable liner portions. In the later case the slit 13E would allow a user to separate vertically a portion of the liner by downside motion, thereby facilitating the peeling of the labels 10.

As observed, the label systems 10 may be spaced from the liner side edges 13C and 13F, so as to facilitate the peeling of the label system 10 from the removable liner portions 13B or the main liner portion 13A, respectively. For example, each label system 10 may be spaced from the first liner side edge 13F by a distance of just more than 0 mm to 30 mm, or more specifically by a distance of just more than 0 mm to 5 mm. Alternatively, the label systems 10 could extend all the way to the first liner side edge 13C and/or 13F and thereby be located adjacent the liner side edge 13C and/or 13F such that they cover entirely the removable liner portion 13B and/or the main liner portion 13A.

In an embodiment in which notches 13D are provided in the liner side edge 13F between adjacent removable liner portions 13B, the notches 13D may provide indications relative to the position of the label systems 10 on the roll 20, in a sheet or in any other format, to a sensor used for printing an inscription, such as indicia, markings, instructions, graphics, logos, serial numbering, text, an image, a barcode or the like, and/or for encoding a wireless tag such as RFID, NFC and the like on the labels, such as a sensor of a label printer for example, thereby facilitating the printing of an inscription on the label systems 10. It is also possible to add label position indicators 13G on the liner 13 or on the facestock 11, for position detection by a sensor associated with a printer. The label position indicators 13G may be darker lines or marks, visually detectable features, at periodic locations along the roll 20 or on a liner sheet.

Still referring to FIG. 5, tear lines 13H may be provided to separate the liner 13 in segments. For example, the tear lines 13H may be formed in the liner 13 between each label system 10, such that a label system 10 and its associated portion of liner 13 may be detached from the roll 20, or from a sheet, booklet, fanfold or any other format of label system 10 and liner 13. When the label system 10 is detached with its associated portion of liner 13, it may come with both the removable liner portion 13B and the main liner portion 13A. In an embodiment, if facestock waste portion is not removed from around the label systems 10, then a face cut slit may be present in the facestock 11 along or parallel (e.g., generally parallel) to the slit 13E, or adjacent to or superimposed with the slit 13E, to facilitate the release of the label systems 10 from the surrounding matrix of waste material when the removable portion is lifted. Other face cuts may be present such as along or parallel (e.g., generally parallel) to tear lines 13H.

The facestock in the roll 20 can also include a waste portion affixed to the label receiving surface of the liner 13 and surrounding entirely or partially the label systems 10, or alternatively, the facestock may not include a waste portion and may only include the label systems 10 when the roll 20 is provided to a user.

The removable liner portions 13B, which can be separated from the main liner portion 13A and which remain affixed to the label system 10 when the label system 10 is peeled off the liner 13, may facilitate the peeling of the label systems 10 off the liner 13. The removable liner portions 13B may also facilitate the manipulation of the label system 10 once the label system 10 has been removed from the liner 13, and the affixing of the label system 10 to the desired surface. For example, the removable liner portion 13B can prevent the label system 10 from sticking to the user's finger or gloves, which would impede the manipulation of the label system 10. Moreover, by eliminating the need for the user to directly touch the label's adhesive, this configuration can reduce or eliminate the risk for a user to have an allergic reaction upon contact with the adhesive to natural rubber or latex or other ingredients which may be used in the adhesive. The removable liner portion 13B may also act as a reinforcement to rigidify or increase the stiffness of label system 10 to reduce the bending of the label system 10 during the peeling, handling and affixing of the label system 10.

Once the label system 10 has been peeled off from the main liner portion 13A, the label system 10 may have different physical and/or mechanical properties at different areas of the label system 10. Specifically, since the removable liner portion 13B is still affixed to a portion of the label system 10, that portion of the label together with the removable liner portion 13B has a different stiffness, and more specifically a greater stiffness, i.e. a greater Young's modulus, compared to the label portion without the main liner portion 13A thereon.

Also due to the removable liner portion 13B remaining affixed to a portion of the label system 10, the portions of the label system 10 with and without the liner 13 may also have different thickness, tensile behaviour, optical transparency, bending stiffness and/or rotational stiffness. This can facilitate the manipulation of the label system 10 which may otherwise be relatively flimsy and may be difficult to direct to the microscope slide 1 on which the label system 10 is to be affixed.

Figure 6:
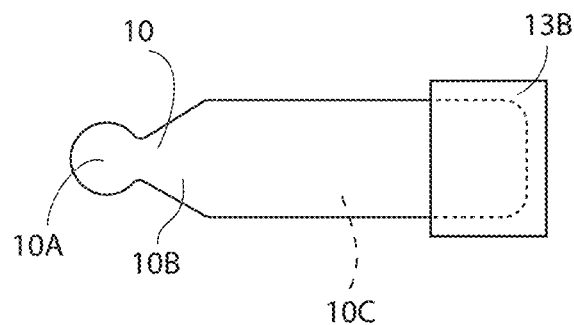
FIG. 6 is a rear end view of one of the label systems of FIG. 5, with another possible removable liner portion in accordance with another embodiment of the present disclosure.

FIG. 6 shows an embodiment that corresponds to the embodiment of FIG. 5, in that the liner portion 13B covering the main label portion 10C is the removable liner portion that remains adhered to the label system 10, while the cover label portion 10A and the neck 10B have their adhesive surface exposed by the peeling of the label system 10 from the main liner portion 13A (FIG. 5). It is also possible to have the liner portion 13A cover only the cover label portion 10A, or the cover label portion 10A and only part of the neck 10B.

In such an embodiment, the user would first adhere the cover label portion 10A onto the label 3 (FIG. 2C) or onto shield portion 10D, and optionally use the removable liner portion 13B to manipulate the label system 10. The removable liner portion 13B could then be peeled off, such as once the label system 10 is separated as in FIG. 2D. The main label portion 10C may then be adhered to the microscope slide 1, as in FIG. 2E. Due to the relatively small size of the cover label portion 10A in the example illustrated herein, it may be easier to adhere the cover label portion 10A to the microscope slide 1 first, using the main label portion 10C for the manipulation, to then adhere the main label portion 10C to the slide 1, the latter operation being relatively easier due to the optionally larger area of the main label portion 10C. As observed in FIG. 6, the removable liner portion 13B may only cover an end of the main label portion 10C, of sufficiently large dimension to allow finger manipulation of the label system 10 via the removable liner portion 13B. The removable liner portion 13B may be longer, and may potentially extend to a part of the neck portion 10B of the label system 10. However, in an embodiment, as the neck portion 10B of the label system 10 may be deformed during use, the absence of the removable liner portion 13B on the neck portion 10B may facilitate the manipulations and the compliance of the label system 10. In an embodiment, the cover label portion 10A may be larger in size, or may be the same size as the main label portion 10C, in which case either portion 10A or 10C may be applied first to the slide 1.

Figure 7:
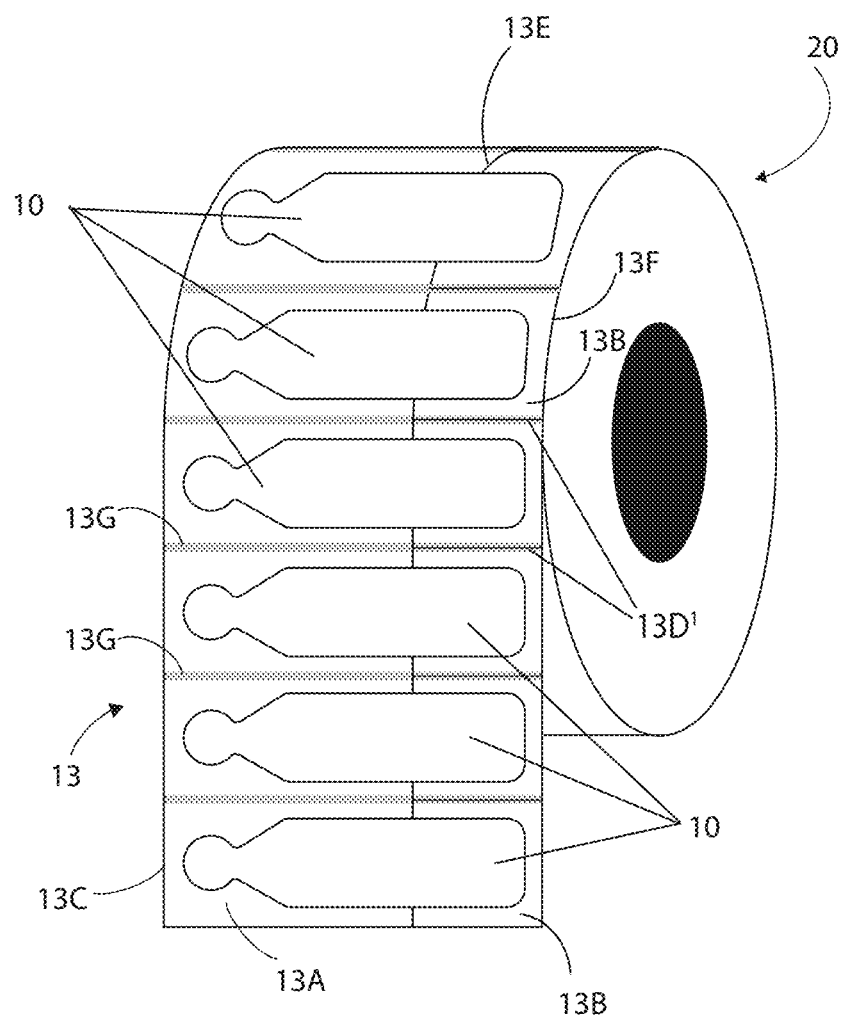
FIG. 7 is a perspective view of a series of the label system of FIGS. 1A-1E, in a roll with a two-part support liner, in accordance with another embodiment of the present disclosure.
Figure 8:
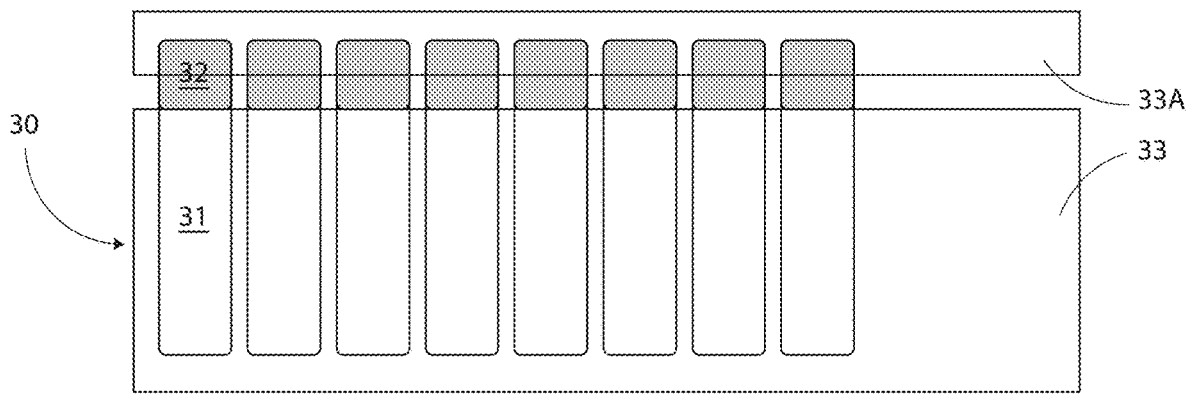
FIG. 8 is a schematic view of a label remover in accordance with a variant of the present disclosure.

Referring to FIG. 7, an alternative embodiment to that of the roll 20 is shown. Instead of notches 13D (FIG. 5) between the removable liner portions 13B, slits 13D' may be provided, to cause a separation between the removable liner portions 13A. The slits 13D' may be die-cut into the liner 13, and may also extend into the waste portions of facestock 11 if present. The roll 20 of FIG. 7, may or may not have some of the features of the roll 20 of FIG. 5, such as pre-printed data, writable or printable zones, webs of liner between removable liner portions 13B and main liner portion 13A, label position indicators 13G, the tear lines 13H. Likewise, the label systems 10 in the roll 20 of FIG. 7 may be as described in any of the embodiments described herein.

As a possibility, the removable liner portion 13B and/or the main liner portion 13A or part thereof may not be removed and may be left affixed to the label system 10, while the main label portion 10C or part of it is adhered to the slide 1. The removable liner portion 13B may remain attached to the slide 1 via the label system 10. In these implementations, the removable liner portion 13B may therefore be used as a tag and/or a tab to provide information to the user, such as for example information regarding the slide 1 or the content of the slide 1. As a possibility, an inscription could be printed on the removable liner portion 13B. The removable liner portion 13B could also be blank to allow the user to manually write an indication thereon, or to receive another label containing an indication. The removable liner portion 13B could also be used as a tab to remove the label system 10 from the slide 1 if desired. The user could simply grasp the removable liner portion 13B and move it towards a remainder of the label system 10 to peel the label system 10 off from the slide 1. In some implementations, the label system 10 may incorporate one or more tear lines (e.g., 10B'), perforations or cuts which would allow the user to tear away a portion of the label system 10 prior, during or after the application of the label system 10 or could allow the label to be used for tamper-evident applications, for example. Other features associated with the removable liner portion 13B and main liner portion 13A are as described in U.S. patent application Ser. No. 17/092,719, filed on Nov. 9, 2020 and incorporated herein by reference.

In addition to the embodiments shown herein, the label system 10 can be positioned in any orientation on a roll or sheet, such as landscape, portrait, vertical, with any appropriate angle. An orientation can be provided to facilitate automatic peeling from a peeling device or from a robotic device.

The label system 10 may be said to be an easy, one-step solution to re-identify microscope slides, and may optionally eliminate the need for hard-to-manipulate dot labels or messy cover-up inks. In a variant, the label system 10 has a color distinct from that of the label 3. For example, the label system 10 may have a contrasting color such as a vibrant yellow color or another color, to contrast with the label 3 and thus visually indicate that the microscope slide 1 has been re-identified. Instead of having label 3 thereon, the microscope slide may be printed using a microscope slide printer or any other printing or writing method, in which case the label system 10 and/or any portions of it including 10A, 10B and 10C may be applied directly onto the printed portion of the microscope slide to cover existing information and/or provide new information.

In a variant, the adhesive of the adhesive layer 12 is selected such that the label system 10 allows glove manipulations with release. The label system 10 may also be compatible with manual and automated slide processing systems such as a digital slide scanning equipment or other systems handling, manipulating or processing of slides. The adhesive of the adhesive layer 12 may allow removal of the cover label portion 10A without compromising the integrity of the label 3 underneath. In an embodiment, the label system 10 may be printable with most commercially available thermal-transfer printers. In another embodiment, the label system 10 may be printable with most commercially available direct-thermal printers. In another embodiment, the label system 10 may be printable with most commercially available inkjet printers. In another embodiment, the label system 10 may be printable with most commercially available laser printers. In another embodiment, the label system 10 may be printable with most commercially available LED printers. In another embodiment, the label system 10 may be printable with most commercially available flexographic printers, In another embodiment, the label system 10 may be printable with most commercially available digital printers. In another embodiment, the label system 10 may be printable with most commercially available laser etching printers.

The label system 10 can be applied to any other container for covering an identification on it or information of an existing label on it (e.g., existing scan code of existing label 3), such as a cassette, histological cassette, a plate, a cell culture plate, a PCR plate, a dish, a petri dish, a paraffin block, a vial, a cryovial, a tube, a glass tube, a metal tube, a plastic tube, a microcentrifuge tube, a PCR tube, a cell culture tube, a glass tube, a plastic tube, a box, a freezer box, a cryogenic box, a straw, a cryogenic IVF straw, a goblet, a bottle, an autoclave bottle, a freezer rack, cryogenic rack, or any type of container that can comprise any matter inside it or on it. The label system 10 can be applied to any other part or container for covering an identification on it or information of an existing label on it, in industries such as automotive, electrical, electronic, food, etc.

In a variant, after the label system 10 has been printed using any standard thermal-transfer or other printer, the cover label portion 10A is affixed over the existing barcode, and the main label portion 10B of the label system 10, containing a new barcode, is then snapped-off and affixed just below or adjacent to or onto a separate location on the original label 3 on the same microscope slide. The resulting re-labeled slide 1 is now ready for processing, with new information and without interference from the original barcode. In an embodiment, the relabeled slide 1 is compatible with digital slide scanners.

Moreover, the adhesive 12 is specially formulated to allow the label system 10 to be easily removed when the original label information needs to be accessed without damaging the original label 3 or leaving behind any adhesive residue. Original label 3 may be made of a paper, of a polymer or a combination thereof, or of a composite material or any suitable material for a microscope slide label. In a scenario in which the label system 10 is applied to a slide that is printed using a slide printer instead of using a slide label 3, the adhesive 12 may be selected allow the label system 10 to be easily removed when the original information needs to be accessed without damaging the print on the slide 1, and/or without leaving behind any adhesive residue. In some instances, instead of an original label such as that shown at 3, the information may be printed directly on the slide 1 using a slide printer and the label system 10 may be applied over the information printed directly on the slide 1. Indeed, it may be necessary to remove the label system 10 after use. For example, it may be desired to re-establish the visibility of the information of the original label 3. For example, the portion of the label 3 that is concealed by the cover label portion 10A may need to be visible. In a variant, if the cover label portion 10A has its concealing property from a water-soluble material in the facestock 11 or as an additional layer 11A, the cover label portion 10A may be rinsed off, or the additional layer 11A may be dissolved, to expose the transparent or translucent facestock 11, to see through it the data of label 3. The same principle may apply to the main label portion 10B, if desired.

It may also be possible to remove the cover label portion 10A and/or the main label portion 10B altogether. With reference to FIGS. 8, 9A-9C, a label remover 30 may be used. The label remover 30 may be a strip that may have a construction similar to that of the label system 10, such as with a facestock and an adhesive layer. Hence, the construction of the label system 10, as described in FIG. 3A, applies by reference to the label remover 30, and to label remover 40 described below. In a variant, part 31 of the label remover 30 has an adhesive on its undersurface. Part 32 is optionally present, and may be without adhesive (e.g., adhesive neutralized or pattern adhesive coated). A plurality of the label removers 30 may share a common release liner 33, though each label remover 30 may have its own release liner 33. The release liner 33 may include a liner strip 33A that may be peeled off to expose ends of the label removers 30, to facilitate hand picking of the label removers 30. The release liner strip 33A, if present, may be adhered to the label removers 30 in any appropriate way. At least a portion of the label remover 30 may be transparent or translucent, such as the part 31, to assist in positioning it over the label to remove, such as the cover label portion 10A. However, the label remover 30 may be transparent, opaque, or any transparency, translucency or opacity. The part 31 may be made of a different material than the part 32, if present.

Figure 9A:
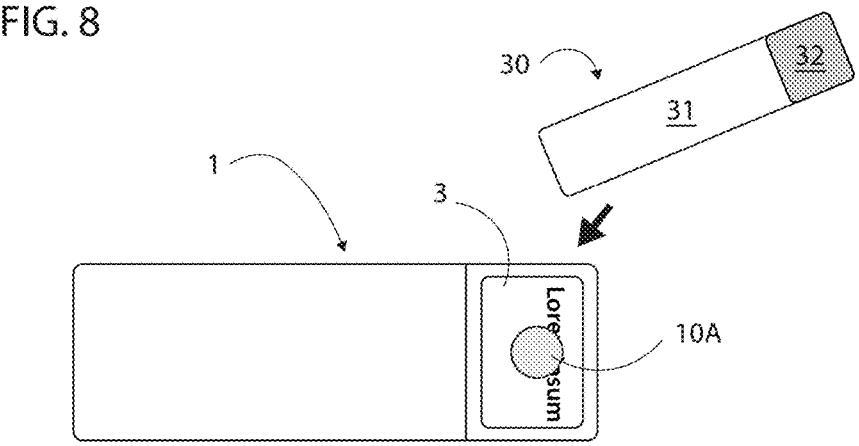
FIGS. 9A to 9C are schematic views showing a sequence of removal of a label from a microscope slide.
Figure 9B:
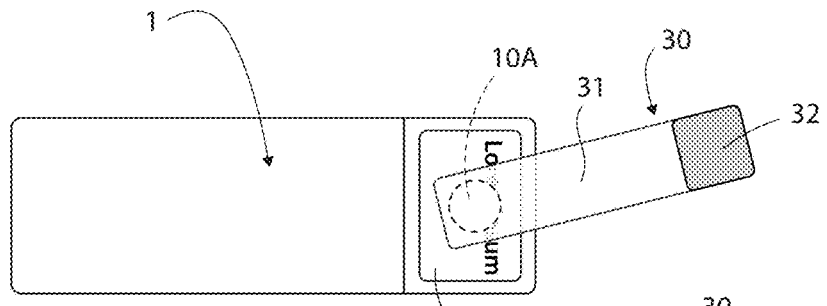
Figure 9C:
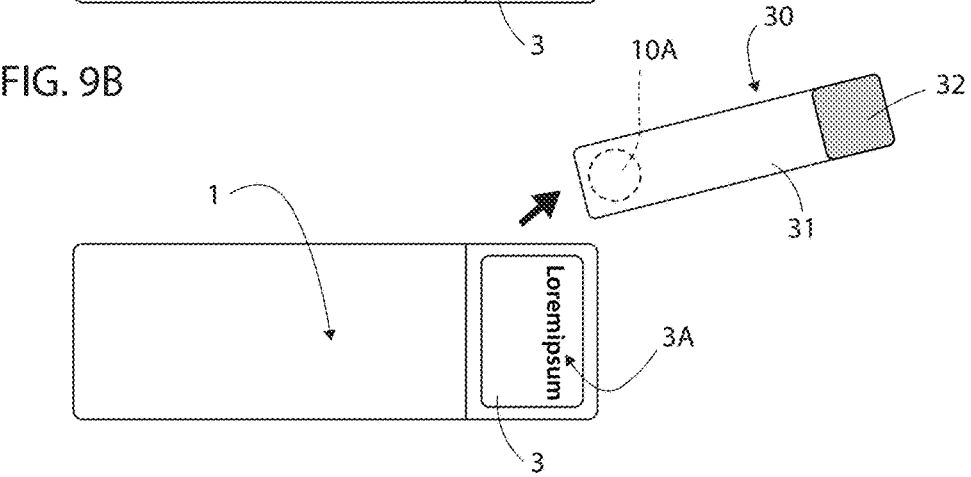

With reference to FIGS. 9A-9C, a sequence to remove a label from the microscope slide 1 is explained. The label remover 30 has its tacky underside exposed, and is moved over the label to be removed, such as cover label portion 10A (as an example only, could be any other label), as shown in FIG. 9A. With reference to FIG. 9B, when part of the label remover 30 is over the label to remove, again cover label portion 10A being an example, a pressure (e.g. manual pressure) is applied over the portion of the label remover 30 that covers the cover label portion 10A, to increase the bond between the label remover 30 and the label to remove. The adhesion force A between the label remover 30 and the cover label portion 10A is greater than the adhesion force B between the cover label portion 10A and the original label 3 or microscope slide 1. Therefore, when the label remover 30 is lifted, the cover label portion 10A remains attached to it and detaches from the original label 3 or microscope slide 1. Accordingly, the original label 3 shows. The adhesive of the label remover 30 therefore provides adhesion force A. However, adhesive force A is such that it does not smudge or affect the ink or printing on the original label 3. Likewise, the adhesive 12 on the underside of the label system 10 is selected so as not to impact the ink or printing on the original label 3. In an embodiment featuring the shield portion 10D covering the label 3, the label remover 30 will remove the cover label portion 10A without removing the shield portion 10D. In another embodiment, the label remover 30 may remove the shield portion 10D with the label portion 10A.

The label remover 30 is shown having a rectangular shape. However, other shapes are possible, such as a shape that emulates that of the label to be removed. For example, the end of the label remover 30 may be semi-circular, as a possibility. It can be observed that the label remover 30 may be long enough to remove the main label portion 10B as well.

Figure 10:
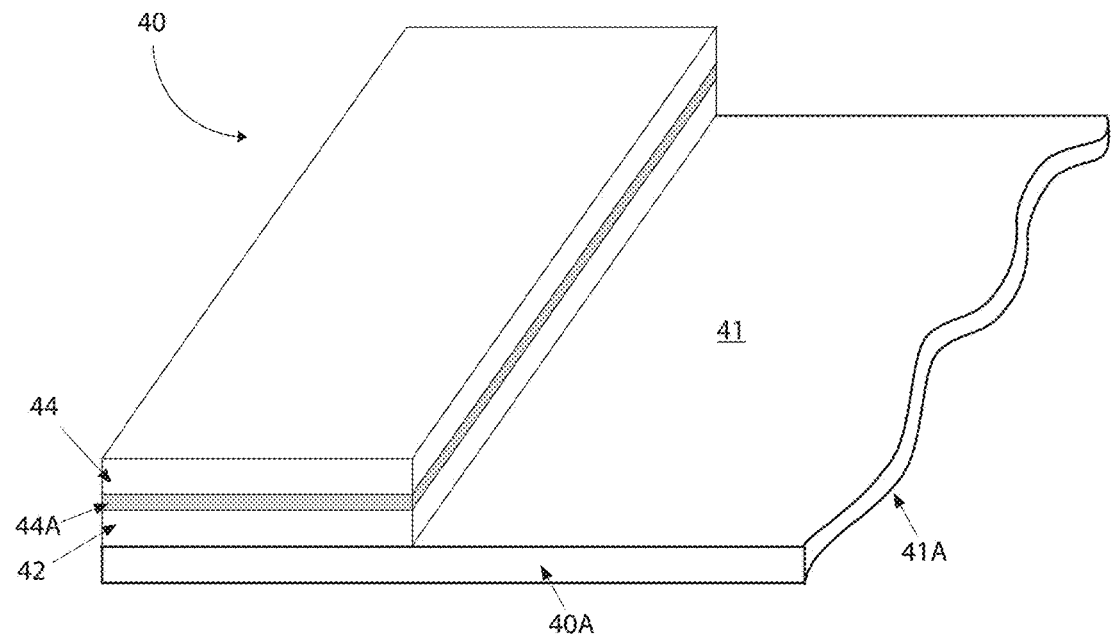
FIG. 10 is a schematic view of a label remover in accordance with another variant of the present disclosure.
Figure 10A:
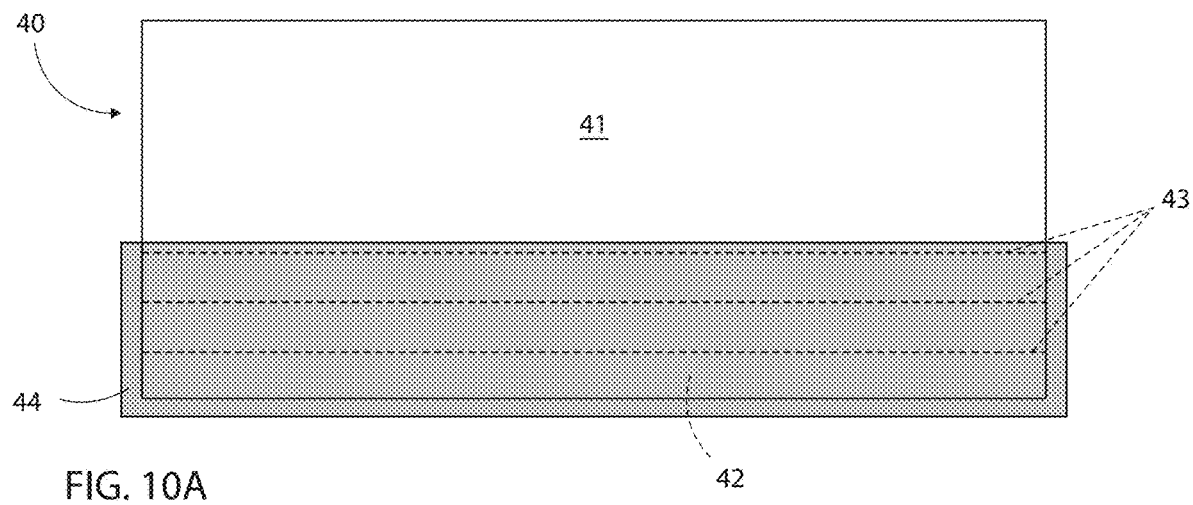
FIGS. 10A-10E are schematic views of different configurations of the label remover of FIG. 10.
Figure 10B:
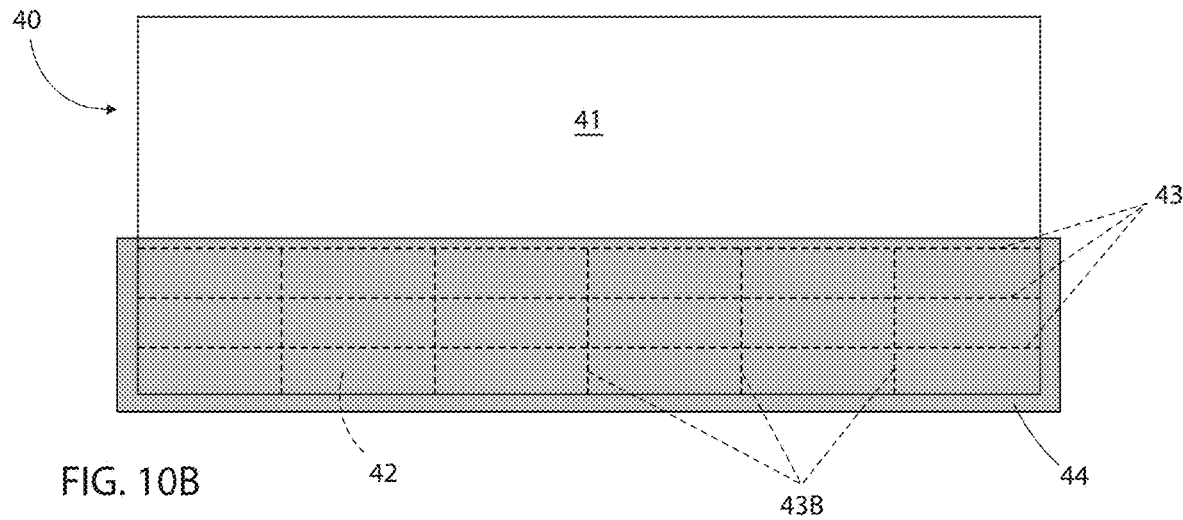
Figure 10C:
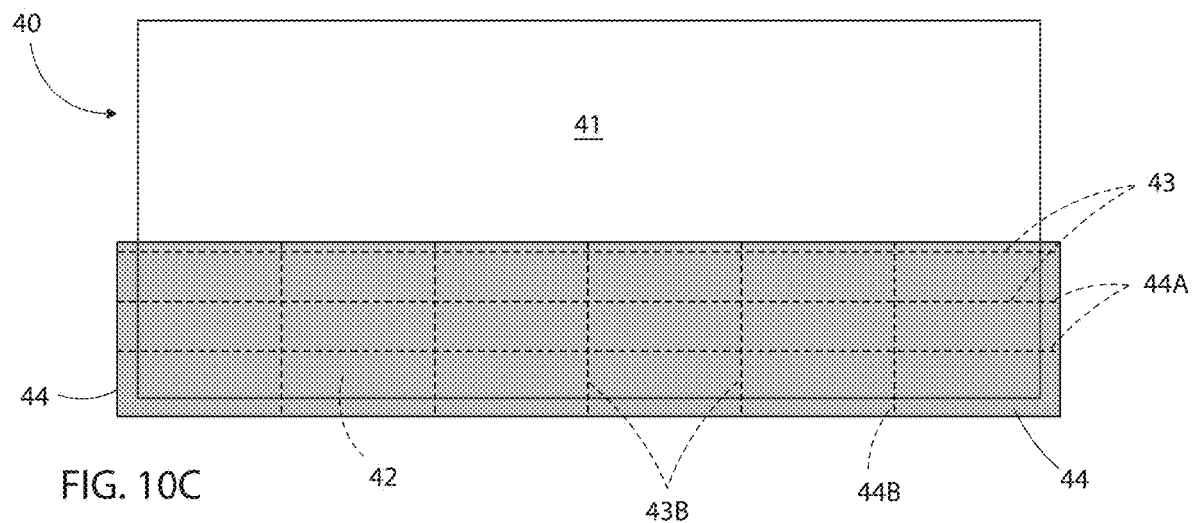
Figure 10D:
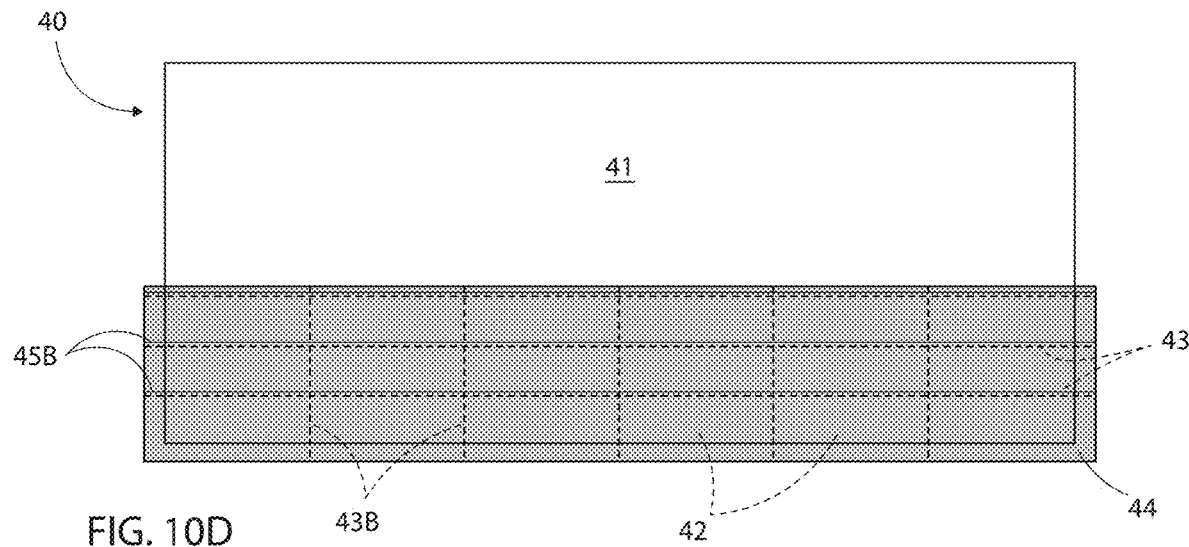
Figure 10E:
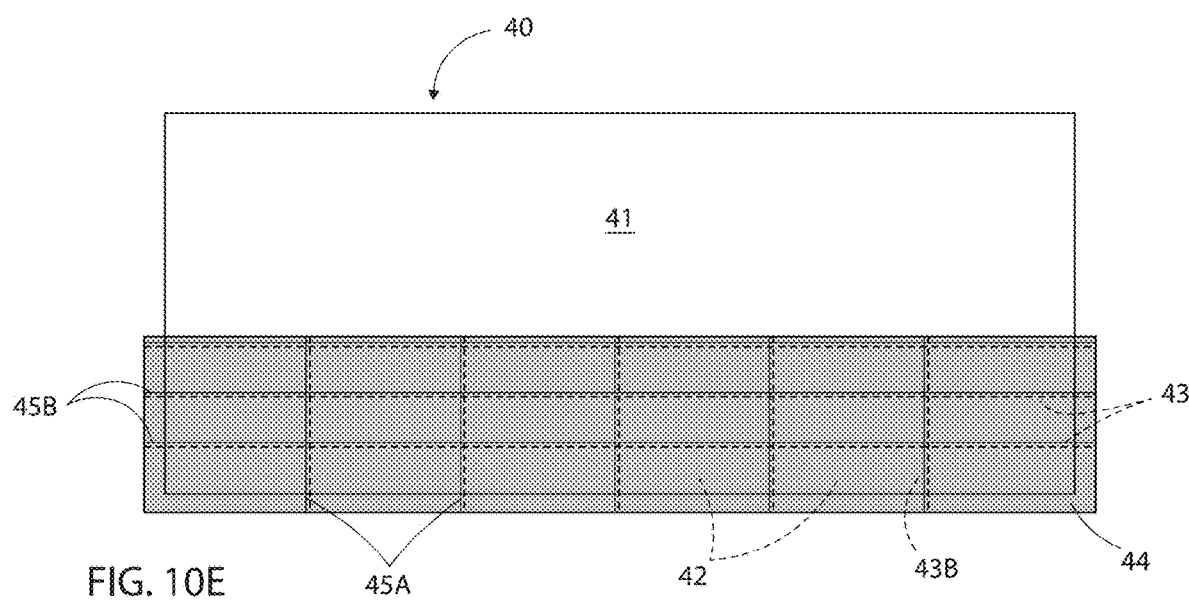
Figure 11A:
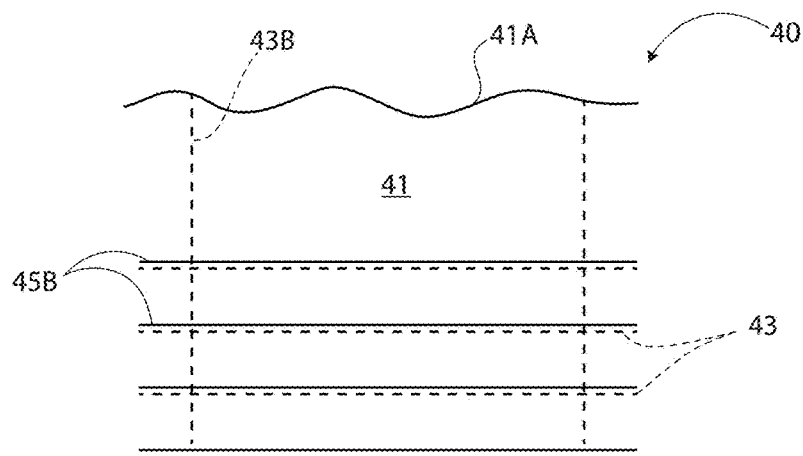
FIGS. 11A-11H are schematic views of different configurations of the label remover of FIG. 10.
Figure 11B:
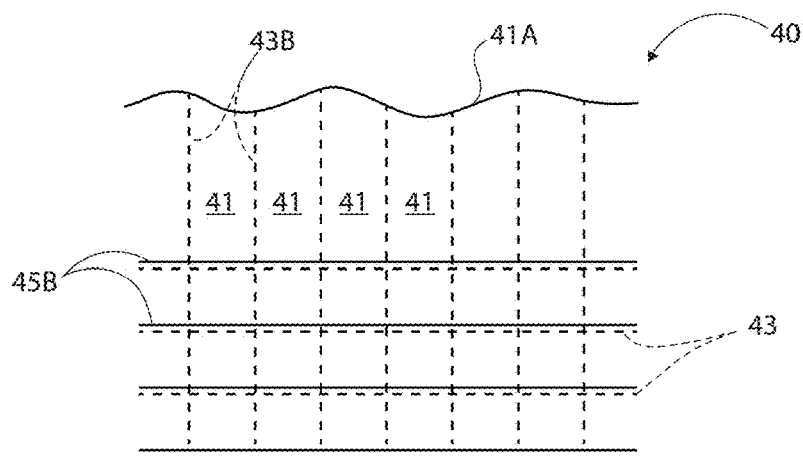
Figure 11C:
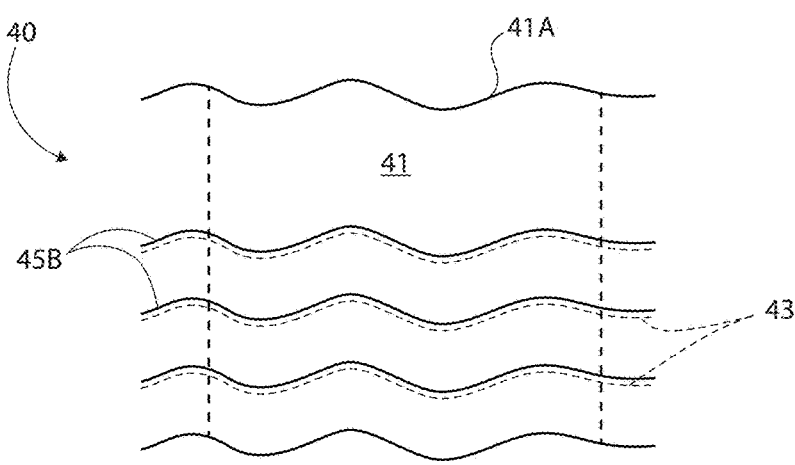
Figure 11D:
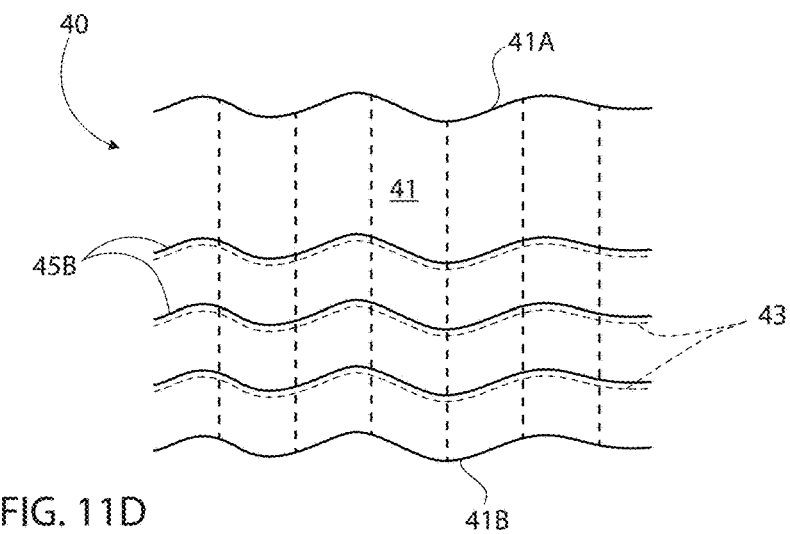
Figure 11E:
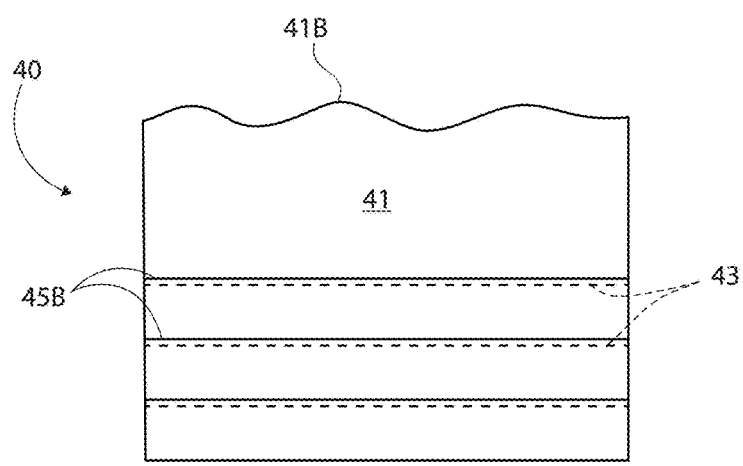
Figure 11F:
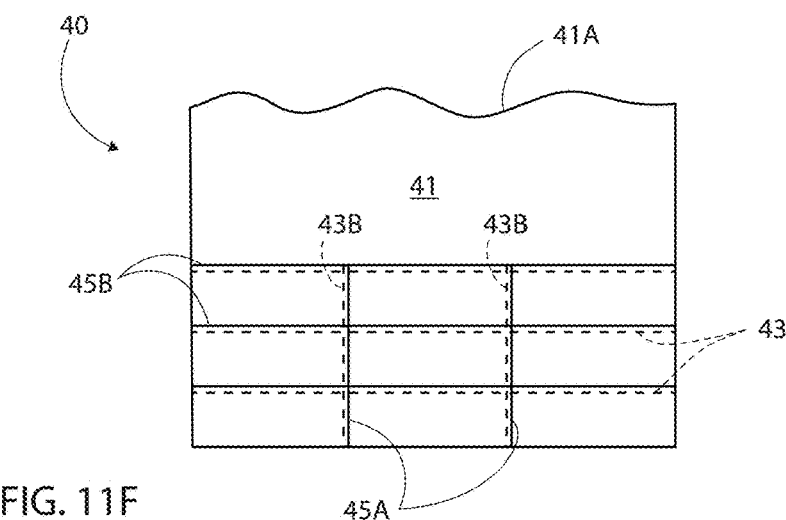
Figure 11G:
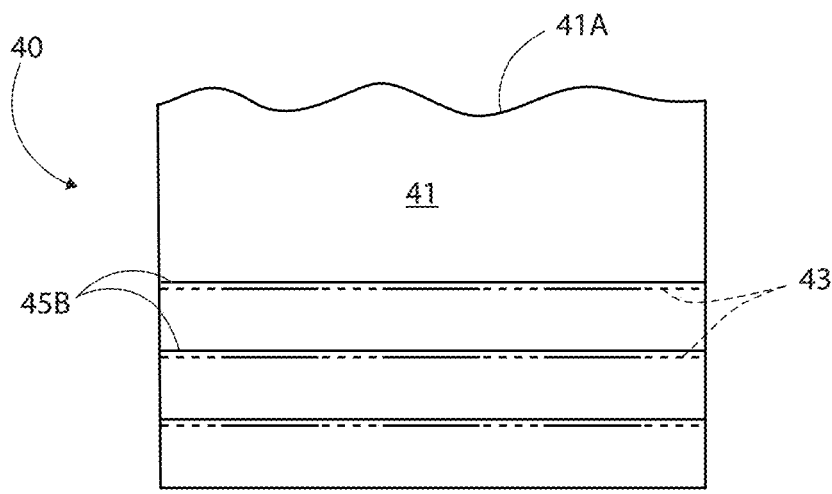
Figure 11H:
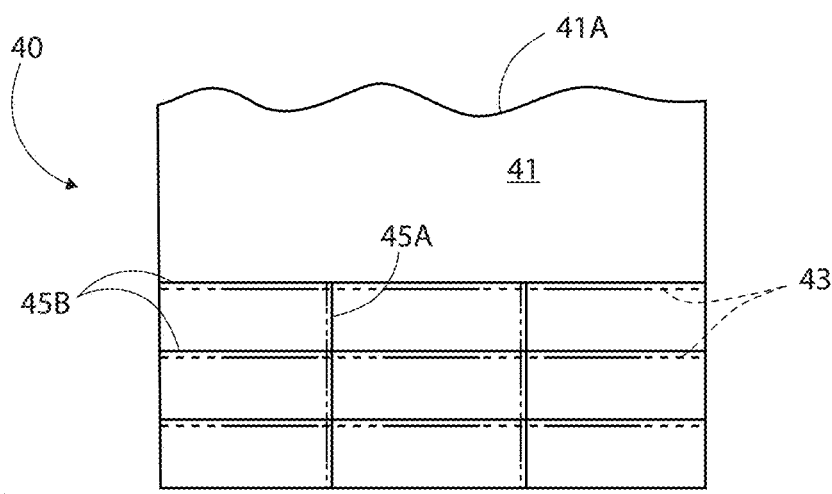

With reference to FIGS. 10A to 10E, another configuration of the label remover is shown at 40, the label remover 40 operating in the same manner as the label remover 30, but being larger, such that the label remover 40 may be used to remove numerous labels, for example from numerous microscope slides 1. FIG. 10 shows an exemplary construction thereof. The label remover 40 has a holding portion 41, by which it is manipulated. The label remover 40 may have a rigidity to make it comfortable to hold via the holding portion 41, with an optional ergonomic arcuate edge portion 41A, such as with a wavy pattern. As shown in FIG. 10, the label remover 40 may have a facestock 40A material(s) may include but is not limited to polymer(s) such as any type of thermoplastic film, any type of polypropylene (PP) of any density, biaxially oriented polypropylene (BOPP), oriented polypropylene (OPP), biaxially oriented polypropylene terephthalate (BOPET), polyethylene (PE), high density polyethylene (HDPE), low density polyethylene (LDPE), high density polyethylene (HDPE), polyester (PET, polyethylene terephthalate), nylon (polyamide), polyolefin, polystyrene, vinyl, polyvinyl including polyvinyl chloride (PVC) and polyvinyl fluoride (PVF), acrylate, nylon, satin, polyethylene, polyimide, Tyvek® (flash-spun high density polyethylene fiber based), nanomaterials, composite materials, silicone, silicone rubber, rubber, synthetic rubber, latex, thermoset plastics, plastic extrusion materials, and may also include cloth tissues, woven or non-woven fabrics, foam, metallic foils such as aluminum foil, Velcro®, environmentally friendly materials, degradable and soluble materials including biodegradable and bio compostable materials. The label remover 40 has an adhesive portion 42, that serves to detach labels, in a similar manner as the part 31 of the label remover 30. The adhesive of label remover 40 may be permanent, removable, or repositionable with any degree of permanency, removability or repositionability respectively. The adhesive in the label remover may be any type of adhesive including pressure-sensitive adhesives, and non-limitative examples include a water-based acrylic, an emulsion adhesive, a hot melt including a UV hot melt, UV acrylic, a rubber-based adhesive, a latex-based adhesive, a solvent-based adhesive, a silicon-based adhesive, a UV-curable adhesive, a LED-curable adhesive including a LED-UV-curable adhesive, a cross-linked adhesive, heat activated adhesive, adhesives for cold-stamping or hot-stamping, any combination thereof, etc. The adhesive portion 42 may be divided into a series of strips, by perforations in perforation lines 43. For example, the perforations are between 4 TPI and 24 TPI (teeth per inch) inclusively, or can also be in the microscale, such as by being from 24 TPI and 350 TPI. Thus, when an optional release liner 44 (having for example a release coating 44A) is removed, the label remover 40 may be used to remove labels from one slide to another. Once a strip 42 is full, or at any other desired moment, it may be discarded with any label attached to it. FIG. 10B shows a similar embodiment, but forming a grid by the intersection of perforations lines 43 with transverse perforation lines 43B. Hence, smaller segments of the adhesive portion 42 may be removed in comparison to the strips of FIG. 10A. In FIG. 10C, the release liner 44 also has perforation lines, such as 44A and/or 44B, to emulate the grid of FIG. 10B or the strips of FIG. 10A. Hence, a limited portion of the adhesive portion 42 may be exposed, such as a single segment (or more) or a single strip (or more). Also, instead of perforation lines, slits 45A (FIG. 10D) and/or 45B (FIG. 10E) may be present in the support liner 44.

Referring to FIGS. 11A to 11H, additional embodiments of the label remover 40 are shown, with the optional arcuate edge portion 41A and 41B (FIG. 11D), such as wavy patterns, for ergonomic reasons, and/or to better match the shape of the label to be removed. It can also be observed that the perforations 43B may extend into the holding portion 41, to selectively define smaller holding portions 41. The perforations 43B extending into the holding portion 41 may be for every line of perforations 43B in the adhesive portion 42 or there may be fewer. In an embodiment, both perforation lines and the slits may be present in the same support liner 44 adjacent to each other, as in FIG. 11G. In an embodiment, the perforation lines 43 or 43B or both may be present in the holding portion 41. In an embodiment, the support liner may not extend to the perimeter or boundaries of the label remover 40. embodiment, the label remover 30/40 is made of a transparent polymer made of rigid plastic such as PET with a thickness between 2.0 mil and 100.0 mil. In an embodiment, the label remover 30 or 40 is made of a transparent polymer made of rigid plastic such as PET with a thickness between 5.0 mil and 20.0 mil. In an embodiment, the label remover 30 or 40 is made of a transparent polymer made of rigid plastic such as PET with thickness between 5.0 mil and 12.0 mil. In an embodiment, the support liner 44 may not extend to the perimeter or boundaries of the label remover 40. One of the edges or more than one edge of the label remover 40 may have a wavy outline(s) to be more comfortable for holding and/or removing cover labels from microscope slides. The label remover 40 may be provided in a sheet, roll or fanfold format with perforations to facilitate the separation of desired size. In an embodiment, the label remover 40 is provided in a fanfold format. In another embodiment, the label remover 40 is provided in a roll format.

The label system 10 may thus generally be described as being for a microscope slide, and may have a facestock configured to have data on a first surface thereof, and an adhesive layer on a second surface of the facestock. The facestock may define a cover label portion and a main label portion, separable from the cover label portion, the cover label portion configured to cover an existing identification on the microscope slide, the main label portion having identification data, the identification data differing from the existing identification, the main label portion configured to be adhered to the microscope label at a position differing from that of the cover label portion.

A method for applying a label system onto a microscope slide may be as shown in FIGS. 2A to 2F, and may include: adhering a cover label portion of a label system over an existing identification of the microscope slide, whereby the cover label portion covers the existing identification at least partially; manually separating a main label portion from the cover label portion while the cover label portion remains on the existing identification; and adhering the main label portion onto the microscope slide. The label system 10 may have any shape or form that allows a peeling of the label system 10 with its two or more label portions attached together in a single motion, one portion of the label system to be applied on an existing scan code of the label 3 of the microscope slide and the other portion being readily detachable from the first portion. As a result the number of manipulations is reduced in comparison to label sets (one cover label, one main label) being separated from a support liner. In an embodiment, the separation of the main label portion from the cover label portion may be done using a tool, an instrument, a device, a mechanism or robotic or automation equipment instead of doing it manually.

The label configurations and methods described hereinafter may be used in any industry where labels are used. Some implementations of the label configurations and methods may further be particularly well suited for use in certain industries. In particular, the labels used in some industries—such as in biotechnology, biomedicine, cell banking, tissue banking, biobanking, histology, diagnostic labs, sample processing labs, bio-pharmaceutical, agricultural, medical, veterinary and animal facilities and clinics, and other fields involving cryogenic bio-preservation or freezing of biological specimen—are typically required to be thinner and more flexible than in other fields and are therefore substantially more difficult to peel using prior art methods. For example, it has been shown that cryogenic label materials that are intended for use at −80 C and below such as inside liquid nitrogen tanks at −196 C or below or that are exposed to liquid helium at −269 C may have facestock elongation values between 10% and 500% or even more. It will however be understood that the label configurations and methods described hereinafter are not limited to use in these fields, and may be used instead in other fields such as packaging, automotive, electrical, electronics, avionics, aerospace, food, chemical, agricultural, fashion, gas and oil, plumbing, heavy industrial, light industrial, construction, or any other suitable filed or industry.

The invention claimed is:

1. A method for applying a label system onto a microscope slide, comprising:
adhering a cover label portion of a label system over an existing identification of the microscope slide, whereby the cover label portion covers the existing identification;
separating a main label portion from the cover label portion while the cover label portion remains on the existing identification; and
adhering the main label portion onto the microscope slide.

2. The method according to claim 1, including removing a first liner portion from the cover label portion and keeping a second liner portion on the main label portion prior to adhering the cover label portion against the microscope slide, and removing the second liner portion from the main label portion prior to adhering the main label portion against the microscope slide.

3. The method according to claim 1, including inscribing or printing data on the label system.

4. The method according to claim 1, wherein separating the main label portion from the cover label portion includes separating the main label portion from the cover label portion at a neck portion.

5. The method according to claim 4, wherein separating the main label portion from the cover label portion at the neck portion includes tearing the neck portion.

6. The method according to claim 1, wherein separating the main label portion from the cover label portion includes applying a tearing force between the main label portion and the cover label portion.

7. The method according to claim 1, including removing the cover label portion from the microscope slide after use.

8. The method according to claim 1, including adhering a transparent shield portion onto the existing identification of the microscope slide prior to adhering the cover label portion on the existing identification, and wherein adhering the cover label portion over the existing identification of the microscope slide includes adhering the cover label portion onto the shield portion.

9. The method according to claim 8, including separating the shield portion from a remainder of the label system while the shield portion remains on the existing identification.

10. The method according to claim 9, wherein separating the shield portion from the remainder of the label system includes applying a tearing force between the shield portion and the remainder of the label system.

11. The method according to claim 1, wherein the label system includes a detectable metal, and further including exposing the microscope slide to a metal detection step when the microscope slide is in a waste device.

12. The method according to claim 1, wherein the label system includes a wireless communication chip capable of reading or encoding by a wireless communication reader/encoder.

* * * * *